United States Patent
Mireshghallah et al.

(10) Patent No.: US 12,008,470 B2
(45) Date of Patent: Jun. 11, 2024

(54) METHODS AND SYSTEMS FOR LEARNING NOISE DISTRIBUTIONS FOR NEURAL NETWORKS

(71) Applicant: The Regents of the University of California, Oakland, CA (US)

(72) Inventors: Fatemehsadat Mireshghallah, La Jolla, CA (US); Hadi Esmaeilzadeh, La Jolla, CA (US); Mohammadkazem Taram, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 615 days.

(21) Appl. No.: 17/073,143

(22) Filed: Oct. 16, 2020

(65) Prior Publication Data

US 2024/0152744 A1 May 9, 2024

Related U.S. Application Data

(60) Provisional application No. 62/916,123, filed on Oct. 16, 2019.

(51) Int. Cl.
*G06N 3/08* (2023.01)

(52) U.S. Cl.
CPC ................................ *G06N 3/08* (2013.01)

(58) Field of Classification Search
None
See application file for complete search history.

(56) References Cited

U.S. PATENT DOCUMENTS

| | | | | |
|---|---|---|---|---|
| 2018/0336463 A1* | 11/2018 | Bloom | ....................... | G06N 3/08 |
| 2019/0188402 A1* | 6/2019 | Wang | ....................... | G06N 7/01 |
| 2020/0076570 A1* | 3/2020 | Musuvathi | ............... | G06F 21/72 |
| 2020/0111022 A1* | 4/2020 | Silberman | ............... | G06N 3/045 |
| 2021/0056405 A1* | 2/2021 | Bradshaw | ................ | G06N 3/08 |

OTHER PUBLICATIONS

F Mireshghallah et al. Shredder: Learning Noise to Protect Privacy with Partial DNN Inference on the Edge. May 26, 2019. arXiv. [retrieved from internet on Apr. 21, 2023] <URL: https://arxiv.org/abs/1905.11814v1> (Year: 2019).*

S Osia et al. A Hybrid Deep Learning Architecture for Privacy-Preserving Mobile Analytics. May 8, 2019. arXiv. [retrieved from internet on Apr. 21, 2023] <URL: https://arxiv.org/abs/1703.02952v6> (Year: 2019).*

(Continued)

*Primary Examiner* — Bion A Shelden
(74) *Attorney, Agent, or Firm* — Perkins Coie LLP

(57) ABSTRACT

Described are methods, devices and applications for learning noise distribution on information from any data processing method. In an embodiment of the described technology, a method includes determining an amount of shredding used in a shredding operation by which source data is converted into shredded data, and transferring the shredded data over an external network to a remote server for a data processing task. The shredding reduces the information content and incurs a limited degradation to an accuracy of the data processing task due to the shredding operation.

18 Claims, 17 Drawing Sheets

(56) References Cited

OTHER PUBLICATIONS

J Wang et al. Not Just Privacy: Improving Performance of Private Deep Learning in Mobile Cloud. Jan. 5, 2019. arXiv. [retrieved from internet on Apr. 21, 2023] <URL: https://arxiv.org/abs/1809.03428> (Year: 2019).*

Abadi, M.; et al. 2016. "Deep learning with differential privacy" In Proceedings ACM Conference on Computer and Communications Security (CCS). 14 pages.

Alves, T. et al. "Trustzone: Integrated hardware and software security," Jan. 2004—Abstract Only.

Axonium "23andme scandal highlights data privacy concerns shared by axonium and mr koh boon hwee . . . " online accessed May 2019 https://medium:com/@Axonium_org/23andme-scandal-highlights-data-privacy-concerns-shared-by-axonium-and-mr-koh377-boon-hwee-dd2e241f1ef2. 14 pages.

Bahmani, R. et al. "Secure multiparty computation from sgx," IACR Cryptology ePrint Archive, vol. 2016, p. 1057, 2016.

Bittau, A. et al. "Prochlo: Strong privacy for analytics in the crowd," in Proceedings of the 26th Symposium on Operating Systems Principles, SOSP '17, (New York, NY, USA), pp. 441-459, ACM, 2017.

Bos, J.W. et al. "Improved security for a ring-based fully homomorphic encryption scheme," in Proceedings of the 14th IMA International Conference on Cryptography and Coding—vol. 8308, IMACC 2013, (Berlin, Heidelberg), pp. 45-64, Springer-Verlag, 2013.

Cachin, C. et al., "Trusting the cloud," Acm Sigact News, vol. 40, No. 2, pp. 81-86, 2009.

Chabanne, H. et al. "Privacy-preserving classification on deep neural network," IACR Cryptology ePrint Archive, vol. 2017, p. 35, 2017.

Cusumano, M.A. "Cloud computing and saas as new computing platforms.," Commun. ACM, vol. 53, No. 4, pp. 27-29, 2010.

Differential Privacy Team, "Learning with privacy at scale," tech. rep., Apple, 2017. online accessed May 2019 https://machinelearning:apple:com/docs/learning-with-privacy-at-scale/appledifferentialprivacysystem:pdf.

Ding, B. et al. "Collecting telemetry data privately," in Proceedings of the 31st International Conference on Neural Information Processing Systems, NIPS'17, (USA), pp. 3574-3583, Curran Associates Inc., 2017.

Dowlin, N. et al. "Cryptonets: Applying neural networks to encrypted data with high throughput and accuracy," in Proceedings of the 33rd International Conference on International Conference on Machine Learning—vol. 48, ICML'16, pp. 201-210, JMLR.org, 2016.

Dwork, C. et al. "Calibrating noise to sensitivity in private data analysis," in Proceedings of the Third Conference on Theory of Cryptography, TCC'06, (Berlin, Heidelberg), pp. 265-284, Springer-Verlag, 2006.

Dwork, C. et al. "Our data, ourselves: Privacy via distributed noise generation," in Proceedings of the 24th Annual International Conference on The Theory and Applications of Cryptographic Techniques, EUROCRYPT'06, (Berlin, Heidelberg), pp. 486-503, Springer-Verlag, 2006.

Dwork, C. et al. "The algorithmic foundations of differential privacy," Found. Trends Theor. Comput. Sci., vol. 9, pp. 211-407, Aug. 2014.

Erlingsson, U. et al. "Rappor: Randomized aggregatable privacy preserving ordinal response," in Proceedings of the 21st ACM Conference on Computer and Communications Security, (Scottsdale, Arizona), 2014.

Esmaeilzadeh, H. et al. "Dark silicon and the end of multicore scaling," IEEE Micro, vol. 32, pp. 122-134, 2012.

Gentry, C. "Fully homomorphic encryption using ideal lattices," in In Proc. STOC, pp. 169-178, 2009.

Goldfeld, Z. et al. "Estimating information flow in neural networks," 2018. 20 pages.

Goodfellow, J. et al. "Multi-digit number recognition from street view imagery using deep convolutional neural networks," CoRR, vol. abs/1312.6082, 2014. 13 pages.

Guo, D. et al. "Additive non-gaussian noise channels: Mutual information and conditional mean estimation," in Proceedings. International Symposium on Information Theory, 2005. ISIT 2005., pp. 719-723, IEEE, 2005.

Guo, D. et al. "Mutual information and minimum mean-square error in gaussian channels," IEEE Transactions on Information Theory, vol. 51, pp. 1261-1282, Apr. 2005.

Han, S. et al. "Deep compression: Compressing deep neural network with pruning, trained quantization and huffman coding," CoRR, vol. abs/1510.00149, 2016.

Hanzlik, L. et al. "Micapsule: Guarded offline deployment of machine learning as a service," 2018.

Hardavellas, N. et al.7"Toward dark silicon in servers," IEEE Micro, vol. 31, pp. 6-15, 2011.

Hauswald, J. et al. "Sirius: An open end-to-end voice and vision personal assistant and its implications for future warehouse scale computers," in ASPLOS, 2015.

Hunt, T. et al. "Chiron: Privacy-preserving machine learning as a service,"2018.

Jordan, M.I. et al. "Machine learning: Trends, perspectives, and prospects," Science, vol. 349, No. 6245, pp. 255-260, 2015.

Juvekar, C. et al. "Gazelle: A low latency framework for secure neural network inference," in Proceedings of the 27th USENIX Conference on Security Symposium, SEC'18, (Berkeley, CA, USA), pp. 1651-1668, USENIX Association, 2018.

Kingma, D.P. et al. "Adam: A method for stochastic optimization," CoRR, vol. abs/1412.6980, 2015.

Kocher, P. et al. "Spectre attacks: Exploiting speculative execution," in 40th IEEE Symposium on Security and Privacy (S&P'19), 2019.

Krizhevsky, A. "Convolutional deep belief networks on cifar-10," 2010.

Krizhevsky, A. et al. "Imagenet classification with deep convolutional neural networks," Commun. ACM, vol. 60, pp. 84-90, 2012.

LeCun, Y. (Courant Institute and N. Y. Corinna Cortes (Google Labs, "The mnist dataset of handwritten digits." online accessed May 2019 http://www:pymvpa:org/datadb/mnistthtml.

LeCun, Y. "Gradient-based learning applied to document recognition," 1998.

Leroux, S. et al. "Privacy aware offloading of deep neural networks," 2018.

Liao, J. et al. "Hypothesis testing under mutual information privacy constraints in the high privacy regime," IEEE Transactions on information Forensics and Security, vol. 13, pp. 1058-1071, Apr. 2018.

Lipp, M. et al. "Meltdown: Reading kernel memory from user space," in 27th USENIX Security Symposium (USENIX Security 18), 2018.

Liu, J. et al. "Obiivious neural network predictions via minionn transformations," in Proceedings of the 2017 ACM SIGSAC Conference on Computer and Communications Security, CCS '17, (New York, NY, USA), pp. 619-631, ACM, 2017.

McKeen, F. et al. "Innovative instructions and software model for isolated execution," in Proceedings of the 2Nd International Workshop on Hardware and Architectural Support for Security and Privacy, HASP '13, (New York, NY, USA), pp. 10:1-10:1,ACM, 2013.

Mohassei, P. et al. "Secureml: A system for scalable privacy-preserving machine learning," in 2017 IEEE Symposium on Security and Privacy (SP), pp. 19-38, May 2017.

Motahari-Nezhad, H.R. et al. "Outsourcing business to cloud computing services: Opportunities and challenges," IEEE Internet Computing, vol. 10, No. 4, pp. 1-17, 2009.

NBCNews, "Facebook data harvesting scandal widens to 87 million people." online accessed May 2019 https://www:nbcnews:com/tech/tech-news/facebook-data-harvesting-scandal-widens-87-million-people-n862771.

Ohrimenko, O. et al. "Oblivious multi-party machine learning on trusted processors," in 25th USENIX Security Symposium (USENIX Security 16), (Austin, TX), pp. 619-636, USENIX Association, 2016.

(56) References Cited

OTHER PUBLICATIONS

Osia, S.A. et al. "A hybrid deep learning architecture for privacy-preserving mobile analytics," 2017.
Osia, S.A. et al. "Deep private-feature extraction," IEEE Transactions on Knowledge and Data Engineering, pp. 1-1, 2018.
Riazi, M.S. et al. "Xonn: Xnor-based oblivious deep neural network inference." Cryptology ePrint Archive, Report 2019/171, 2019. https://eprint:iacr:org/2019/171.
Ristenpart, T. et al. "Hey, you, get off of my cloud: Exploring information leakage in third-party compute clouds," in Proceedings of the 16th ACM Conference on Computer and Communications Security, CCS '09, (New York, NY, USA), pp. 199-212, ACM, 2009.
Russakovsky, O. et al. "ImageNet Large Scale Visual Recognition Challenge," International Journal of Computer Vision (IJCV), vol. 115, No. 3, pp. 211-252, 2015.
Sankar, L. et al. "Utility-privacy tradeoffs in databases: An information-theoretic approach," IEEE Transactions on Information Forensics and Security, vol. 8, pp. 838-852, Jun. 2013.
Saxe, A.M. et al. "On the information bottleneck theory of deep learning," in International Conference on Learning Representations, 2018.
Schwarz, M. et al. "ZombieLoad: Cross-privilege-boundary data sampling," arXiv:1905.05726, 2019.
Shannon, C.E. "A mathematical theory of communication," Bell system technical journal, vol. 27, No. 3, pp. 379-423, 1948.
Shokri, R. et al. "Privacy-preserving deep learning," in 2015 53rd Annual Allerton Conference on Communication, Control, and Computing (Allerton), pp. 909-910, Sep. 2015.
Schwartz-Ziv, R. et al. "Opening the black box of deep neural networks via information," 2017.
Szabó, Z. "Information theoretical estimators toolbox," Journal of Machine Learning Research, vol. 15, pp. 283-287, 2014.
Sze, V. et al. "Efficient processing of deep neural networks: A tutorial and survey," Proceedings of the IEEE, vol. 105, No. 12, pp. 2295-2329, 2017.
Temam, O. "A defect-tolerant accelerator for emerging high-performance applications," SIGARCH Comput. Archit. News, vol. 40, pp. 356-367, Jun. 2012.
Tishby, N. et al. "Deep learning and the information bottleneck principle," 2015 IEEE Information Theory Workshop (ITW), Apr. 2015.
Tishby, N. et al. "The information bottleneck method," arXiv preprint physics/0004057, 2000.
Tramer, F. et al. "Slalom: Fast, verifiable and private execution of neural networks in trusted hardware," in International Conference on Learning Representations, 2019.
Van Bulck, J. et al. "Foreshadow: Extracting the keys to the Intel SGX kingdom with transient out-of-order execution," in Proceedings of the 27th USENIX Security Symposium, USENIX Association, Aug. 2018.
Van Laarhoven, T. "L2 regularization versus batch and weight normalization," CoRR, vol. abs/1706.05350, 2017.
Wang, J. et al. "Not just privacy: Improving performance of private deep learning in mobile cloud," in Proceedings of the 24th ACM SIGKDD International Conference on Knowledge Discovery & Data Mining, KDD '18, (New York, NY, USA), pp. 2407-2416, ACM, 2018.
Wang, W. et al. "On the relation between identifiability, differential privacy, and mutual-information privacy," IEEE Transactions on Information Theory, vol. 62, pp. 5018-5029, Sep. 2016.
Weisse, O. et al. "Foreshadow-NG: Breaking the virtual memory abstraction with transient out-of-order execution," Technical report, 2018.
Yao, A.C. "How to generate and exchange secrets," in 27th Annual Symposium on Foundations of Computer Science (sfcs 1986), pp. 162-167, Oct. 1986.
Bonawitz, K .; et al. 2017. Practical secure aggregation for privacy-preserving machine learning. In Proceedings of CCS.
Hendrycks, D.; et al. 2019. Using self-supervised learning can improve model robustness and uncertainty. CoRR abs/1906.12340. 13 pages.
Jamaludin, A.; et al. 2017. Self-supervised learning for spinal mris. CoRR abs/1708.00367. 8 pages.
Kang, Y.; et al. 2017. Neurosurgeon: Collaborative intelligence between the cloud and mobile edge. In Proceedings of ACM Conference on Architectural Support for Programming Languages and Operating Systems (ASPLOS). 15 pages.
Lang, K. 2008. The 20 newsgroups data set. online accessed Jul. 2019 http://qwone.com/jason/20Newsgroups/. 2 pages.
Owens, A. et al. 2018. Audio-visual scene analysis with self-supervised multisensory features. CoRR abs/1804.03641. 19 pages.
Parkhi, O.M. et al. 2015. Deep face recognition. Visual Geometry Group, University of Oxford. 12 pages.
Xiao, Q.; et al. 2017. Security risks in deep learning implementations. CoRR abs/1711.11008. 5 pages.
Yosinski, J.; et al., H. 2014. How transferable are features in deep neural networks? In Proceedings of NIPS. 14 pages.

\* cited by examiner

METHODS AND SYSTEMS FOR LEARNING NOISE DISTRIBUTIONS FOR NEURAL NETWORKS

CROSS-REFERENCE TO RELATED APPLICATION

This application claims priority to U.S. Provisional Application No. 62/916,123, entitled "METHOD AND SYSTEM OF LEARNING NOISE ON INFORMATION FROM INFERENCES BY DEEP NEURAL NETWORK" and filed on Oct. 16, 2019. The entirety of the above application is incorporated by reference as part of the disclosure of this patent document.

STATEMENT REGARDING FEDERALLY SPONSORED RESEARCH OR DEVELOPMENT

This invention was made with government support under FA9550-17-1-0274 awarded by the Air Force Office of Scientific Research and under CNS-1703812 and ECCS-1609823 awarded by the National Science Foundation. The government has certain rights in the invention.

TECHNICAL FIELD

This patent document relates to machine learning techniques, including deep neural networks (DNNs).

BACKGROUND

A deep neural network (DNN) is an artificial neural network (ANN) with multiple layers between the input and output layers. DNNs are applicable to a wide range of services and applications such as language translation, transportation, intelligent search, e-commerce, and medical diagnosis.

SUMMARY

The technology disclosed in this patent document relates to methods, devices and applications for learning noise distribution on information from inferences by machine learning techniques such as deep neural networks (DNNs).

In an embodiment of the disclosed technology, a data processing method includes determining an amount of shredding used in a shredding operation by which source data is converted into shredded data, and transferring the shredded data over an external network to a remote server for a data processing task. The shredding reduces the information content while incurring limited accuracy loss of the data processing task. The data processing task includes an inference task using machine learning techniques such as deep neural network.

For example, the limited accuracy loss or the limited degradation may be measurable and managed to be within a target performance loss.

In another embodiment of the disclosed technology, a data processing method includes determining an amount of shredding used in a shredding operation by which source data is converted into shredded data, and transferring the shredded data over an external network to a remote server for an inference computing. The amount of shredding is determined reduce an information content due to the shredding operation and to limit a degradation in an accuracy of the inference computing due to the shredding operation.

In another embodiment of the disclosed technology, a method of transmitting data over a network includes generating source data to be transmitted over the network, performing a shredding operation on the source data to generate shredded data such that the source data is not recoverable from the shredded data, and transmitting the shredded data over the network. The shredding operation includes adding noise to the source data to generate the shredded data including reduced data content and added noise such that an inference from the shredded data by a data processing method yields a same outcome as an inference from the source data.

In another embodiment of the disclosed technology, a method includes selecting, as a local network, one or more layers of a deep neural network (DNN) with multiple layers between input and output layers such that a computation of the one or more layers is made on an edge device and selecting, as a remote network, remaining layers of the DNN, obtaining a first activation tensor by providing an input to the local network and obtaining an output of the local network responsive to the input, obtaining a second activation tensor by injecting a sampled noise tensor to the first activation tensor, feeding the first activation tensor and the second activation tensor to the remote network to obtain first and second results, respectively, from the remote network, finding a trained noise tensor that minimizes a loss function of the DNN, adding the trained noise tensor to a third activation to be transmitted to the remote network, and transmitting the third activation.

In another embodiment of the disclosed technology, method of feeding the data through a deep neural network (DNN) includes initializing a noise tensor with a predetermined noise distribution, training the noise tensor such that the accuracy of the model is regained and the noise tensor is fit to a distribution, storing the parameters of the fitted noise distribution and tensor element orders of the noise tensor, and performing inference of the DNN based on the noise sampled from the stored distributions and tensor element orders of the noise tensor. The performing of the inference of the DNN includes drawing samples from the stored parameters of the stored noise distribution to populate noise tensors, rearranging tensor elements of the noise tensors to match the stored tensor element orders of the noise tensor, applying the noise tensors to activations, and transmitting the final noisy activation.

The subject matter described in this patent document can be implemented in specific ways that provide one or more of the following features.

DETAILED DESCRIPTION

Figure 1:
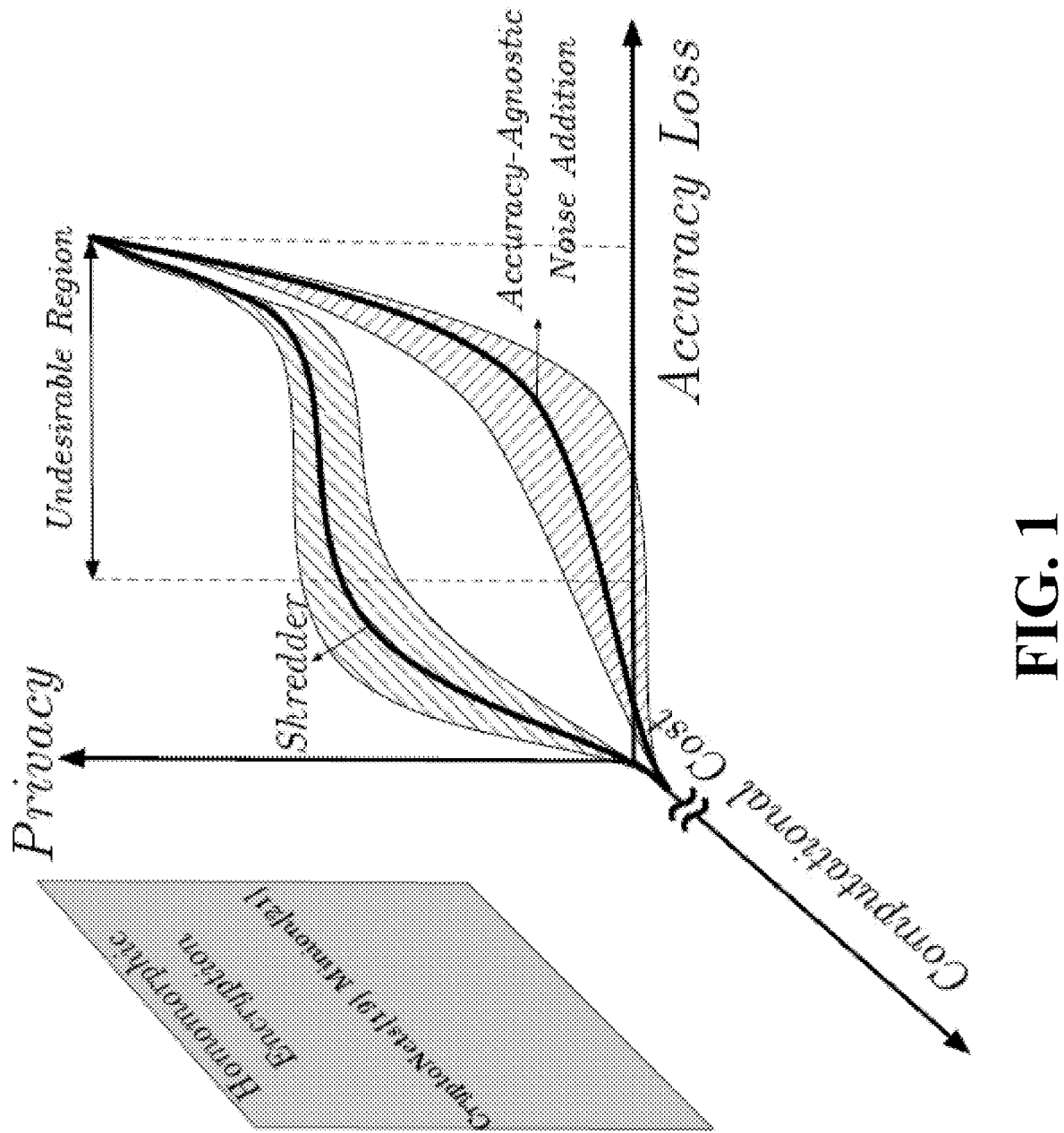
FIG. 1 shows the relationship between privacy, accuracy loss and computational cost.

Online services that utilize the cloud infrastructure are now ubiquitous and dominate the IT industry. The limited computation capability of edge devices, such as cellphones, or personal assistants, and the increasing processing demand of learning models has naturally pushed most of the computation to the cloud. Coupled with the advances in learning and deep learning, this shift has also enabled online services to offer a more personalized and more natural interface to the users. These services continuously receive raw, and in many cases, personal data that needs to be stored, parsed, and turned into insights and actions. In many cases, such as home automation or personal assistant, there is a rather continuous flow of personal data to the service providers for real-time inference. While this model of cloud computing has enabled unprecedented capabilities due to the sheer power of remote warehouse-scale data processing, it can significantly compromise user privacy. When data is processed on the service provider cloud, it can be compromised through side-channel hardware attacks or deficiency in the software stack. But even in the absence of such attacks, the service provider can share the data with business partners or government agencies. Although the industry has adopted privacy techniques for data collection and model training, scant attention has been given to the privacy of users who increasingly rely on online services for inference.

A wide variety of deep neural network (DNN) applications increasingly rely on the cloud to perform their huge computation. This heavy trend toward cloud-hosted inference services raises serious privacy concerns. Such cloud-hosted inference services require the sending of private and privileged data over the network to remote servers, exposing it to the service provider. Even if the provider is trusted, the data can still be vulnerable over communication channels or via side-channel attacks at the provider.

Researchers have attempted to grapple with this problem by employing cryptographic techniques such as multiparty execution and homomorphic encryption in the context of DNNs. However, these approaches suffer from a prohibitive computational and communication cost, exacerbating the already complex and compute-intensive neural network models. Worse still, this burdens additional encryption and decryption layers to the already constrained edge devices despite the computational limit being the main incentive of offloading the inference to the cloud.

Some embodiments of the disclosed technology may be used to reduce the information content of the communicated data without compromising the cloud service's ability to provide a DNN inference with acceptably high accuracy. A method and system of learning noise distribution based on some embodiments of the disclosed technology may be used to learn, without altering the topology or the weights of a pre-trained network, an additive noise distribution that significantly reduces the information content of communicated data while maintaining the inference accuracy. Such a technique may be called "shredder" in the context of this patent document. The method implemented based on some embodiments of the disclosed technology learns the additive noise by casting it as a tensor of trainable parameters to devise a loss function that strikes a balance between accuracy and information degradation. The loss function exposes a knob for a disciplined and controlled asymmetric trade-off between privacy and accuracy. The method implemented based on some embodiments of the disclosed technology, while keeping the DNN intact, enables inference on noisy data without the need to update the model or the cloud. The method implemented based on some embodiments of the disclosed technology can greatly reduce the mutual information between the input and the communicated data to the cloud compared to the original execution while only sacrificing a small loss in accuracy.

FIG. 1 shows the relationship between privacy, accuracy loss and computational cost. Some embodiments of the disclosed technology take an orthogonal approach to reduce the information content of the remotely communicated data through noise injection without imposing a significant computational cost. In order to avoid a significant loss in accuracy by noise injection, the method implemented based on some embodiments of the disclosed technology includes learning a noise tensor with respect to a loss function that incorporates both accuracy and a measure of privacy. Learning noise does not require retraining the network weight parameters or changing its topological architectures. This rather non-intrusive approach is particularly interesting as most enterprise DNN models are proprietary and retraining hundred of millions of parameters is resource and time-consuming. The method implemented based on some embodiments of the disclosed technology, however, may learn a much smaller noise tensor through a gradient-driven optimization process. In some embodiments of the disclosed technology, the noise can be seen as an added trainable set of parameters that can be discovered through an end-to-end training algorithm.

In some embodiments of the disclosed technology, the noise training loss is such that it exposes an asymmetric tradeoff between accuracy and privacy as show in FIG. 1. As such the same model can be run on the same cloud on intentionally noisy data without the need for retraining or the added cost of supporting cryptographic computation. The objective is to minimize the accuracy loss while maximally reducing the information content of the data that a user sends to cloud for an inference service. This problem of offloaded inference is different than the classical differential privacy setting where the main concern is the amount of indistinguishability of an algorithm, i.e., how the output of the algorithm changes if a single user opts out of the input set. In inference privacy, however, the issue is the amount of raw information that is sent out. As such, Shanon's Mutual Information (MI) between the user's raw input and the communicated data to the cloud is used as a measure to quantitively discuss privacy.

The method and system implemented based on some embodiments of the disclosed technology can retrain the network weights and incorporate both privacy and accuracy in the optimization loss by casting noise-injection to protect privacy as finding a tensor of trainable parameters through an optimization process. Empirical analysis shows some implementations of the disclosed technology reduces the mutual information between the input and the communicated data by 70.2% compared to the original execution with only 1.46% accuracy loss.

As depicted in FIG. 1, the disclosed technology can be implemented in some embodiments to take an orthogonal approach, dubbed shredder, and aim to reduce the information content of the remotely communicated data through noise injection without imposing significant computational cost. In some implementations, a portion of the DNN inference is executed on the edge and the rest is delegated to the cloud and noise is applied to the intermediate activation tensor that is sent to the remote servers from the first portion. However, as shown, noise injection can lead to a significant loss in accuracy if not administered with care and discipline. To address this challenge, examples of the technique ("shredder") implemented based on some embodiments of the disclosed technology use a gradient-based learning process to extract the distributions of noise from different learned samples. To learn the noise samples, the technique implemented based on some embodiments of the disclosed technology defines a loss function that incorporates both accuracy and the distance of the intermediate representation of the same public label. In some implementations, the "shredder" technique uses a self-supervised learning process to learn representations (i.e., noise-injected activations) to have larger distance for different labels and closer distance for the same labels. This feature enables the shredder to focus the noise-injected representations on the public labels and diminish the classification capability of the DNN on possible unseen private labels. In this whole process, the only trainable parameters are the noise tensors while the weights and topology of the network is kept intact and the possible private labels are not exposed to shredder. This rather non-intrusive approach is particularly interesting as most enterprise DNN models are proprietary, and retraining hundred of millions of parameters is resource and time consuming. The shredder, in contrast, learns a collection of significantly smaller noise tensors through a gradient-driven optimization process that are converted to distributions.

The main insight is that the noise can be seen as an added trainable set of parameter probabilities that can be discovered through repetition of an end-to-end self-supervised training process. The technique implemented based on some embodiments of the disclosed technology devises the noise training loss such that it exposes an asymmetric tradeoff between accuracy and privacy as depicted in FIG. 1. The objective is to minimize the accuracy loss while maximally reducing the information content of the data that a user sends to cloud for an inference service.

Phase I: Learning the Noise Distributions

The technique implemented based on some embodiments of the disclosed technology may include two phases: 1) an offline noise learning phase; and 2) an inference phase.

The first phase takes in the DNN architecture, the pre-trained weights, and a training dataset. The training dataset is the same as the one used to train the DNN. The output of this phase is a collection of 100 tuples of multiplicative noise distributions and additive noise distributions each coupled with the order for the elements of that noise tensor (to maintain relative order of elements and preserve accuracy) for the inference phase. This phase also determines which layer is the optimal choice for cutting the DNN to strike the best balance between computation and communication while considering privacy. The deeper the cutting point, the higher the privacy level, given a fixed level of loss in accuracy. This is due to the abstract representation of data in deeper layers of neural networks, which cause for less communicated information to begin with, giving the framework a head start. So, as a general rule it is better to choose the deepest layer that the edge device can support. In some implementations, the best cutting point in term of communication and computation costs can be determined experimentally by examining each layer in terms of total time of computation and communication to pick the lowest. In addition, this phase outputs the mean accuracy and a margin of error for its collection of distributions. This mean and margin are achieved by experimentation on a held-out portion of the training set.

In the context of this patent document, the word "edge device" is used to indicate any piece of hardware that controls data flow at the boundary between two networks. Examples of the edge device include edge cellphones, personal assistants, or other network devices.

In the context of this patent document, the words "optimal" and "best" that are used in conjunction with the DNN is used to indicate DNN layers, values or conditions that provide a better performance for the DNN than other layers, values or conditions. In this sense, the words optimal and best may or may not convey the best possible result achievable by the DNN.

Phase II: Shredder Inference and Noise Sampling

In this phase, for each inference pass (each time a data is given to the neural network) the collection of tuples, from phase I, is sampled for a tuple of multiplicative noise distribution, additive noise distribution and element orders. Then, the noise distributions (which are both Laplace distributions) are sampled to populate the additive and multiplicative noise tensors, which have the same dimensions as the intermediate activation. Then, the elements of both noise tensors are rearranged, so as to match the saved order for that distribution. For this, the sampled elements are all sorted, and are then replaced according to the saved order of indices from the learning phase. This process makes predicting the noise tensor non-trivial for the adversary, since the noise for each input data is generated stochastically. The multiplicative noise, which is merely a scale and has the same shape as the intermediate activations, is applied to intermediate activations followed by the generated additive noise and the final noisy activation is sent from the edge device to the cloud where the rest of the inference will take place.

Figure 2A:
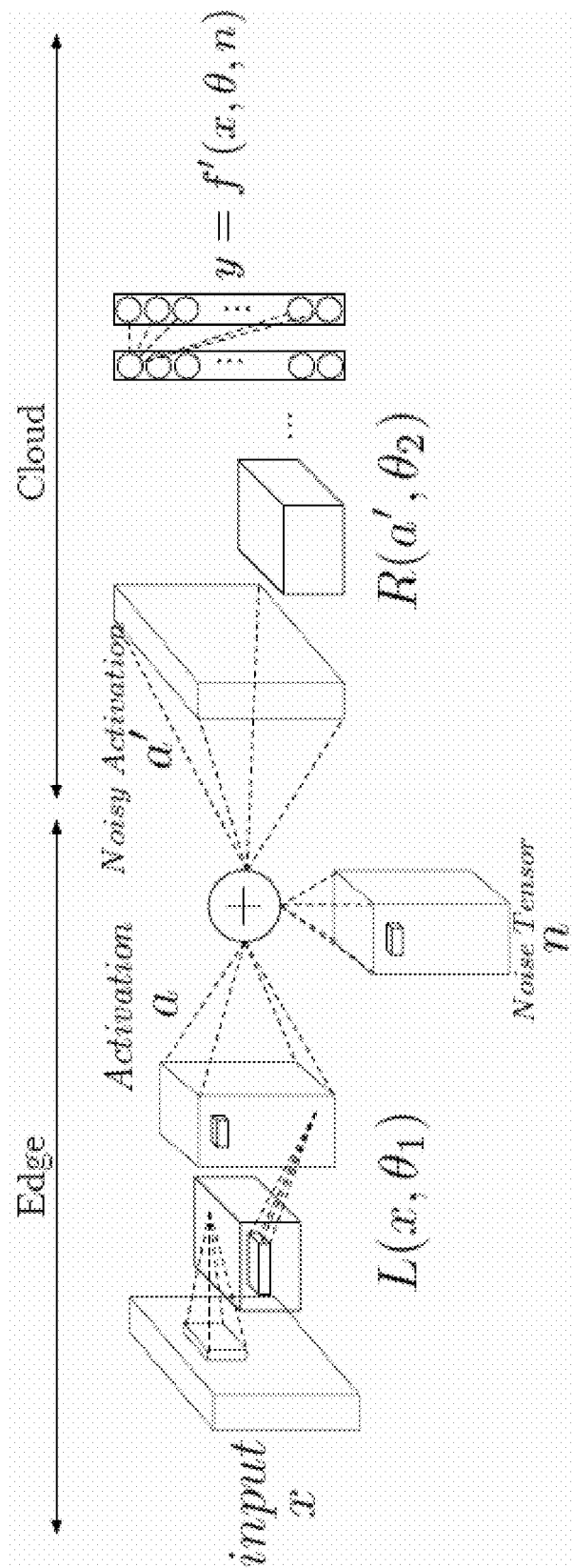
FIGS. 2A-2B illustrate noise injection in the system implemented based on some embodiments of the disclosed technology.
Figure 2B:
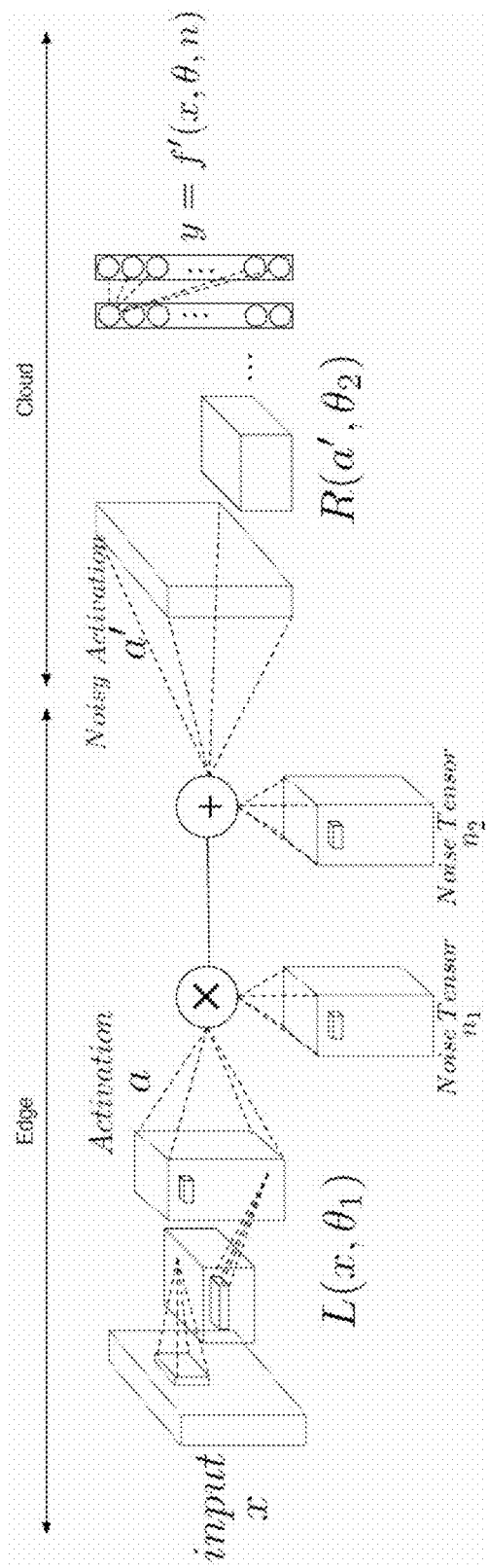
Figure 3B:
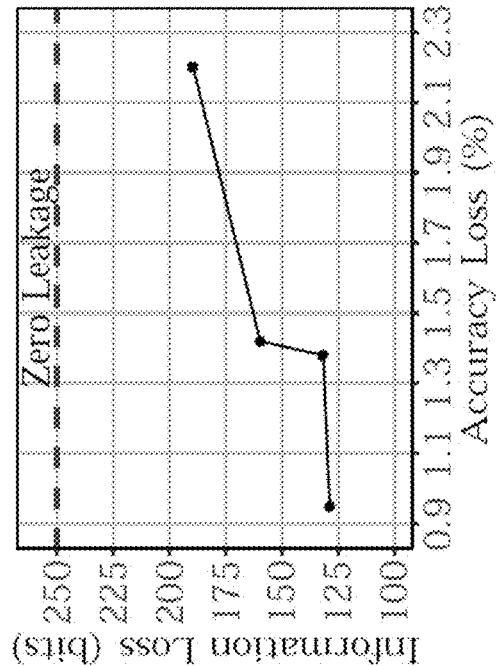
FIGS. 3A-3D show accuracy-privacy trade-off in 4 other example networks, cut from their last convolution layer.
Figure 3D:
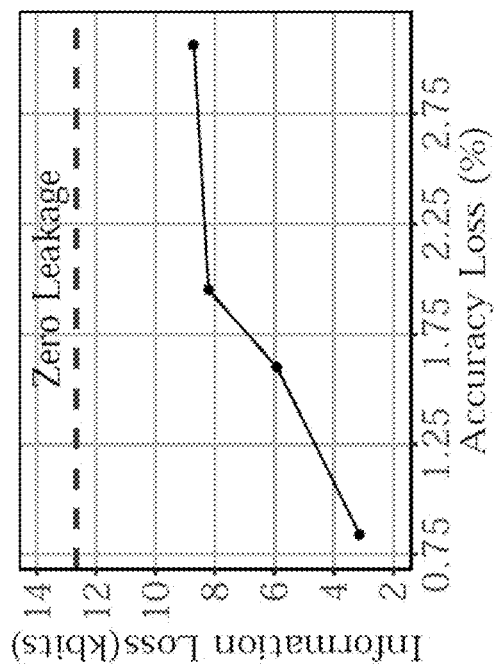
Figure 3A:
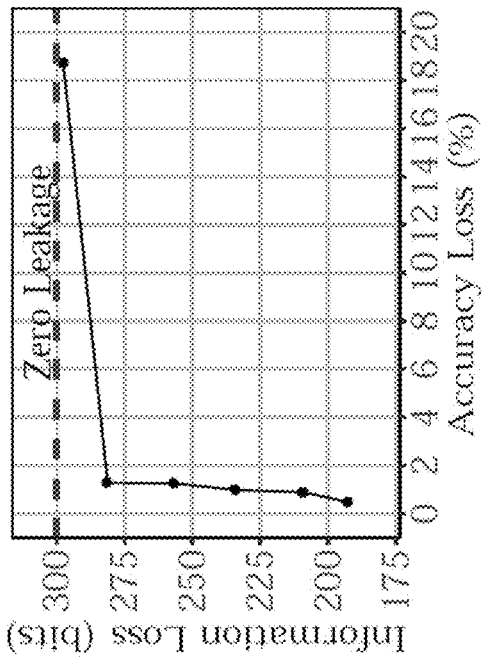
Figure 3C:
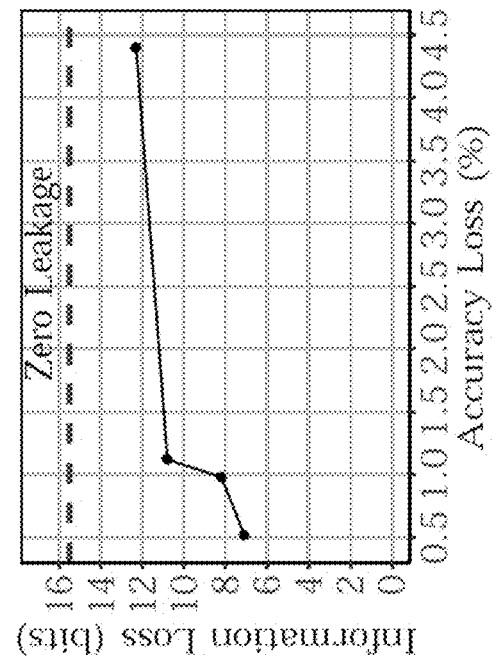

FIGS. 2A-2B illustrate examples of noise injection in the system implemented based on some embodiments of the disclosed technology.

Trainable Noise Tensor

Given a pre-trained network $f(x,\theta)$ with K layers and pretrained parameters $\theta$, a cutting point, $layer_c$, where the computation of all the layers $[\theta \ldots layer_c]$ are made on the edge, is selected. Those layers are referred to as local network, $L(x,\theta_1)$ where $\theta_1$ is a subset of $\theta$ from the original model.

The remaining layers, i.e., $[(layer_c+1) \ldots layer_{K-1}]$, are deployed on the cloud.) These layers are referred to as remote network, $R(x,\theta_2)$, as shown in FIG. 2A.

The user provides input x to the local network, and an intermediate activation tensor $a=L(x,\theta_1)$ is produced. Then, a noise tensor n is added to the output of the first part, $a'=a+n$. This a' is then communicated to the cloud where R (a', $\theta_2$) is computed on noisy data and produces the result $y=f'(x,n,\theta)$ that is at sent back to the user.

The objective is to find the noise tensor n that minimizes the loss function discussed below. To be able to do this through a gradient based method of optimization, we must find the $\partial y/\partial n$:

$$\frac{\partial y}{\partial n} = \frac{\partial f'(x,\theta,n)}{\partial n} = \qquad \text{Eq. (1-1)}$$

$$\frac{\partial R((a+n),\theta_2)}{\partial n} = \frac{\partial layer_{K-1}}{\partial Layer_{K-2}} \times \ldots \times \frac{\partial Layer_{c+1}}{\partial (a+n)} \times \underbrace{\frac{\partial (a+n)}{\partial n}}_{=\frac{\partial n}{\partial n}=1}$$

Since $L(x,\theta_1)$ is not a function of n, it is not involved in the backpropagation. Gradient of R is also computed through chain rule as shown above. Therefore, the output is differentiable with respect to the noise tensor.

Similarly, the objective is to find the noise tensors n1, n2 that minimize the loss function as will be discussed below, while the rest of the model parameters are fixed. To be able to do this through a gradient based method of optimization, we must find the $\partial y/\partial n1$ and $\partial y/\partial n2$. For the former, we have:

$$\frac{\partial y}{\partial n_1} = \frac{\partial f'(x,\theta,n_1,n_2)}{\partial n_1} = \frac{\partial R((n_1 \times a + n_2),\theta_2)}{\partial n_1} = \qquad \text{Eq. (1-2)}$$

$$\frac{\partial layer_{K-1}}{\partial Layer_{K-2}} \times \ldots \times \frac{\partial Layer_{c+1}}{\partial (n_1 \times a + n_2)} \times \underbrace{\frac{\partial (n_1 \times a + n_2)}{\partial n_1}}_{=\frac{\partial n_1 \times a}{\partial n_1}=a}$$

Since $L(x,\theta_1)$ is not a function of n1 or n2, it is not involved in the backpropagation. The same math can be applied to get $\partial y/\partial n2$. Gradient of R is also computed through chain rule as shown above. Therefore, the output is differentiable with respect to the noise tensor and gradient based methods can be employed to solve the optimization problem.

Ex Vivo Notion of Privacy

In some embodiments of the disclosed technology, the privacy is measured based on how much information is leaked from input of the network to the data sent across to the cloud. Information leakage is defined as the mutual information between x and a, i.e., I(x,a), where $$I(x;a) = \int_x \int_a p_{x,a} \log_2 \frac{p_{x,a}}{p_x p_a} dx da. \qquad \text{Eq. (2)}$$

Mutual information has been widely used in the literature for both understanding the behavior of neural networks, and also to quantify information leakage in anonymity systems in the context of databases. The method and system based on some embodiments of the disclosed technology use the reverse of mutual information (1/MI) as the main and final notion of privacy and this can be referred to as ex vivo privacy. In some implementations, the information between the user-provided input and the intermediate state that is sent to the cloud is quantified. The mutual information is considered an information theoretic notion, and therefore it quantifies the average amount of information about the input (x) that is contained in the intermediate state (a). For example, if x and a become independent, I(x,a)=0 and if a=x, then the mutual information becomes the maximum value of I(x,a)=H(x) where H(x) is Shanon's entropy of the random variable x In Vivo Notion of Privacy As the final goal, the method and system based on some embodiments of the disclosed technology may reduce the mutual information between x and a'; however, calculating the mutual information at every step of the training is too computationally intensive. Therefore, instead the method and system based on some embodiments of the disclosed technology can introduce an in vivo notion of privacy whose purpose is to guide the noise training process towards better privacy, i.e., higher 1/MI. To this end, the method and system based on some embodiments of the disclosed technology can use the reverse of signal to noise ratio (1/SNR) as proxy for the ex vivo notion of privacy. Mutual information is shown to be a function of SNR in noisy channels. In some implementations, the relation between the two and show that SNR is a reasonable choice may be empirically investigated.

Loss Function

The objective of the optimization is to find the additive noise distribution in such a way that it minimizes I(x,a') and at the same time maintains the accuracy. In other words, it minimizes $\|R(a, \theta)-R(a', \theta)\|$. Although these two objectives seem to be conflicting, it is still a viable optimization, as the results suggest. The high dimensionality of the activations, their sparsity, and the tolerance of the network to perturbations yields such behavior.

The noise tensor that is added is the same size as the activation it is being added to. The number of elements in this tensor would be the number of trainable parameters in our method. The method and system based on some embodiments of the disclosed technology may initialize the noise tensor to a Laplace distribution with location parameter $\mu$ and scale parameter b. Similar to the initialization in the traditional networks, the initialization parameters, i.e., b and $\mu$ are considered hyperparameters in the training and need to be tuned. This initialization affects the accuracy and amount of noise (privacy) of the method and system implemented based on some embodiments of the disclosed technology.

The method and system based on some embodiments of the disclosed technology can be used to evaluate the privacy of the technique during inference through ex vivo (1/MI) notion of privacy. However, during training, calculating MI for each batch update would be extremely compute-intensive. For this reason, the method and system based on some embodiments of the disclosed technology may use an in vivo notion of privacy which uses (SNR) as a proxy to MI. In other words, the method and system based on some embodiments of the disclosed technology may incorporate SNR in the loss function to guide the optimization towards increasing privacy. The method and system based on some embodiments of the disclosed technology may use the formulation SNR=$E[a^2]/\sigma^2(n)$, where $E[a^2]$ is the expected value of the square of activation tensor, and $\sigma^2(n)$ is the variance of the noise added. Given the in vivo notion of privacy above, the loss function would be:

$$-\sum_{c=1}^{M} y_{o,c} \log(p_{o,c}) + \lambda \frac{1}{\sigma^2(n)} \quad \text{Eq. (3)}$$

Where the first term is cross entropy loss for a classification problem consisting M classes ($y_{o,c}$ indicates whether the observation o belongs to class c and $P_{o,c}$ is the probability given by the network for the observation to belong to class c), and the second term is the inverse of variance of the noise tensor to help it get bigger and thereby, increase in vivo privacy (decrease SNR). λ is a coefficient that controls the impact of in vivo privacy in training. Since the numerator in the SNR formulation implemented based on some embodiments of the disclosed technology is constant, it is not involved in the calculations. The standard deviation of a group of finite numbers with the range R=max−min is maximized if they are equally divided between the minimum, min, and the maximum, max. This is in line with the observations that as the magnitude of the noise increases, the in vivo privacy increases. In some implementations, the noise tensor is initialized in a way that some elements are negative and some are positive. The positive ones get bigger, and the negative ones get smaller, therefore, the standard deviation of the noise tensor becomes bigger after each update. Therefore, the technique implemented based on some embodiments of the disclosed technology employs a formulation opposite to L2 regularization, in order to make the magnitude of noise elements greater. Thus, the loss becomes:

$$-\sum_{c=1}^{M} y_{o,c} \log(p_{o,c}) - \lambda \sum_{i=1}^{N} |n_i| \quad \text{Eq. (4)}$$

This applies updates opposite to L2 regularization term (weight decay, and λ is similar to the decay factor), instead of making the noise smaller, it makes its magnitude bigger. The λ exposes a knob here, balancing the accuracy/privacy trade-off. That's why it should be tuned carefully for each network. If it is very big, at each update the noise would get much bigger, impeding the accuracy from improving. And if it is too small, its effect on the noise may be minimal. In one example, −0.01, −0.001, and −0.0001 may be used. In general, as the networks and the number of training parameters get bigger, it is better to make 2 smaller to prevent the optimizer from making huge updates and overshooting the accuracy.

When initializing noise with a Laplace distribution, the scale factor of the distribution determines the initial in vivo privacy. Depending on the initial in vivo privacy, initial accuracy and the λ, different scenarios may occur. One scenario is where λ is tuned so that the in vivo privacy remains constant, the same as its initial value (within a small fluctuation range) and only the accuracy increases. Another scenario occurs if the initial in vivo privacy is a lot bigger than what is desired (this usually occurs if the initialized noise tensor has a high scale factor)—it is easier (faster in terms of training) to set 2 very small or equal to zero and train until accuracy is regained. In this case the in vivo privacy will decrease as the accuracy is increasing, but since it was extremely high before, even after decreasing it is still desirable. One other possibility is that the initial in vivo privacy is lower than what we want and when training starts, it will increase as accuracy increases (or if it is not perturbed much by the initial noise, it stays constant).

Loss Function and Self-Supervised Learning

The objective of the optimization is to find the noise distributions in such a way as to minimize I(x,a') and at the same time maintains the accuracy. Although these two objectives seem to be conflicting, it is still a viable optimization, as the results suggest. The high dimensionality of the activations, their sparsity, and tolerance of the network to perturbations yields such behavior. Thus, the technique implemented based on some embodiments of the disclosed technology uses self-supervision to train the noise tensors to achieve an intermediate representation of the data that contains less private information. In a problem definition, the framework is not aware of what data is considered private. It only knows the primary classification task of the network. Therefore, the framework assumes that anything except the primary labels is excessive information. In other words, the training process uses the information it has, supervises itself, and learns a representation that only contains the necessary information without access to the private labels. To make this possible, the technique implemented based on some embodiments of the disclosed technology attempts at decreasing the distance between representations (intermediate activations) of inputs with the same primary labels and increasing the distance between those with different labels. This approach trains the noise tensors as if the framework is speculating what information may be private, and it tries to remove it, but using only the public primary labels.

The performance of this self-supervised process against private label classification shows its effectiveness in causing high misclassification rates for them. As mentioned before, the shredder technique may use two noise tensors, both of which are the same size as the activations they are being multiplied by (scaled) and added to. The number of elements in these noise tensors equals to the number of trainable parameters in our method. The rest of the model parameters are all fixed.

During conventional training at each iteration, a batch of training data is selected, fed through the network. Then, using a given loss function, back-propagation and gradient based methods, the trainable parameters are updated. The shredder's algorithm, however, as shown in table 1 below, modifies this by choosing a second random batch of training data, passing it through the first partition of the neural network, L (x,$\theta_1$) in FIG. 2B, and then applying both multiplicative (e.g., $n_1$) and additive (e.g., $n_2$) noise tensors. This yields $a'_i$ and $a'_j$ for members of the main batch and random batch, respectively. Then, the L2 distance between the representations for corresponding members of the main batch and the random batch is computed. If the corresponding elements in each of the batches have the same primary labels, the distance between their representations should have a positive coefficient, since we would want to decrease it. If the primary labels are different, the distances would get a negative coefficient before being used in the loss function. Hence, a loss function with the formulation below is given:

$$-\sum_{c=1}^{M} y_{o,c} \log(p_{o,c}) + \lambda\left(\sum_{(i,j):Y_i=Y_j} |a'_i - a'_j|^2 + \sum_{(i,j):Y_i \neq Y_j} (c - |a'_i - a'_j|^2)\right)$$

Eq. (5)

TABLE 1

Training process algorithm of "shredder" technique

| | |
|---|---|
| 1 | Procedure Training (model, training set, λ, c) |
| 2 | For all (data, labels) ∈ training set do |
| 3 | (data_rand, labels_rand) ← random (training_set) |
| 4 | output ← model.local (data) |
| 5 | output ← model.local (output) |
| 6 | output_rand ← model.local (data_rand) |
| 7 | output ← model.local (output_rand) |
| 8 | distance ← \|output_rand − output\|² |
| 9 | positive ← (labels == labels_rand) |
| 10 | negative ← (labels != labels_rand) |
| 11 | positive ← sum (distance × positive) |
| 12 | negative ← sum (distance × negative) |
| 13 | logits ← model (data) |
| 14 | loss ← CrossEntropy (logits, labels) + λ(pos+(c−neg)) |
| 15 | update_noise_tensors (loss) |
| 16 | End for |
| 17 | End procedure |

As discussed above, where the first term is cross entropy loss for a classification problem consisting M classes ($y_{o,c}$ indicates whether the observation o belongs to class c and $p_{o,c}$ is the probability given by the network for the observation to belong to class c) and the second term minimizes the distance between intermediate activations with same labels while maximizing the distance between those with different labels. i and j are iterators over the main batch and random batch members, respectively and Y is the primary label for that batch member. A and c are hyperparameters that should be tuned for each network. A exposes a knob here, balancing the accuracy/privacy trade-off. That's why it should be tuned carefully for each network. If it is very big, at each update the noise would get much bigger, impeding the accuracy from improving. And if it is too small, its effect on the noise would be minimal. In some implementations, 0.01, 0.001 and 0.0001 can be used.

The shredder technique initializes the multiplicative noise tensor to 0 and the additive tensor to a Laplace distribution with location parameter μ and scale parameter b. Similar to the initialization in the traditional networks, our initialization parameters, i.e., b and μ are considered hyperparameters in the training and need to be tuned. This initialization affects the accuracy and amount of initial noise (privacy) of our model.

The privacy of the technique during inference through ex vivo (1=MI) notion of privacy can be evaluated. However, during training, calculating mutual information (MI) for each batch update may be intractable. Thus, the shredder technique uses an in vivo notion of privacy which uses (SNR) as a proxy to MI. In other words, the shredder technique uses SNR to monitor privacy during training. In some implementations, the shredder technique can use the formulation SNR=$E[a^2]/\sigma^2(n)$, where $E[a^2]$ is the expected value of the square of activation tensor, and $\sigma^2(n)$ is the variance of the noise, which is a'−a, using the notation from FIG. 2B. This can be used to estimate the relative privacy achieved for each set of hyperparameters, during parameter tuning.

Extracting Distributions and Element Orders

During training, the model is constantly tested on a held out portion of the training set. When the accuracy goes higher than a given threshold (the amount the user is willing to compromise) the training is halted and the shredder technique proceeds to distribution extraction. The technique implemented based on some embodiments of the disclosed technology can use maximum likelihood estimation of the distribution parameters, i.e., loc and scale, to fit each learned noise tensor to a Laplace distribution. It's worth mentioning that this stage is executed offline. The parameters for these Laplace distributions are saved. The element orders of the noise tensor are also saved. By the element orders, the sorted indices of the elements of the flattened noise tensor is meant. For instance, if a tensor looks like [[3.2, 4.8], [7.3, 1.5]], it's flattened version would be [3.2, 4.8, 7.3, 1.5], and the sorted which is what the collector saves would be [2, 1, 0, 3].

Noise Sampling

In some implementations, Laplace distribution is used for initialization, and training is performed until the desired noise level for the given in vivo privacy (1/SNR) and accuracy is reached. At this point the noise tensor is saved, and the same process is repeated multiple times. This is similar to sampling from a distribution of noise tensors, all of which yield similar accuracy and noise levels. After enough samples are collected, the distribution for the noise tensor is obtained. At this point, for each inference, noise samples are drawn from the stored distribution, and this noise is injected to the activation and sent to the cloud. In this phase the sampling is performed only from stored noise distributions and no training takes place here.

Empirical Evaluation

The accuracy-privacy trade-off, the noise training process with the loss function, a comparison of the in vivo and ex vivo notions of privacy and finally, a network cutting point trade-off analysis will be discussed below.

Mutual Information (MI) is calculated using the Information Theoretical Estimators Toolbox's Shannon Mutual Information with KL Divergence. In some implementations, MI is calculated over the shuffled test sets on MNIST dataset for LeNet, CIFAR-10 dataset for CIFAR-10, SVHN dataset for SVHN, and ImageNet dataset for AlexNet. These photos are shuffled through and chosen at random. Using mutual information as a notion of privacy means that Shredder targets the average case privacy, but does not guarantee the amount of privacy that is offered to each individual user.

Table 2 summarizes experimental results. It is shown that on the networks, the method and system based on some embodiments of the disclosed technology can achieve on average 70.2% loss in information while inducing 1.46% loss in accuracy. The table 2 also shows that it takes the disclosed system a short time to train the noise tensor, for instance on AlexNet it is 0.1 epoch.

TABLE 2

Summary of the experimental results of Shredder for the benchmark networks.

| Benchmark | LeNet | CIFAR | SVHN | Alexnet | Gmean |
|---|---|---|---|---|---|
| Original Mutual Information | 301.84 | 236.34 | 19.2 | 12661.51 | — |
| Shredded Mutual Information | 18.9 | 90.2 | 7.1 | 4439 | — |
| Mutual Information Loss | 93.74% | 61.83% | 64.58% | 64.94% | 70.2% |
| Accuracy Loss | 1.34% | 1.42% | 1.12% | 1.95% | 1.46% |
| Shredder's Learnable Params over Model Size | 0.19% | 0.65% | 0.04% | 0.02% | 0.10% |
| Number of Epochs of Training | 6.3 | 1.7 | 1.2 | 0.1 | 1.06 |

The accuracy-privacy trade-off, the noise training process with the examples of loss function discussed in this patent document, and a comparison to another privacy protection mechanism can be evaluated as discussed below.

Experimental methodology: Mutual Information (MI) is calculated using the Information Theoretical Estimators Toolbox's Shannon Mutual Information with KL Divergence. Due to the high dimensionality of the tensors (especially large images) mutual information estimations are not very accurate. That is why some example techniques implemented based on some embodiments of the disclosed technology use feature selection methods for large networks to decrease dimensionality for MI measurements. The first step is using only one channel, from the three input channels, since the other two channels hold similar information. The second step is removing features with single unique value, and also features with collinear coefficient of higher than 0.98. This helps reduce the dimensionality gravely. As will be discussed below, MI is calculated over the shuffled test sets on MNIST dataset for LeNet, CIFAR-10 dataset for CIFAR-10, SVHN dataset for SVHN, ImageNet dataset for AlexNet, a subset of 24 celebrity faces from VGG-Face for VGG-16 and 20 Newsgroups for a 5 layer DNN. These photos were shuffled through and chosen at random. The primary classification task for VGG-16 is modified to be gender classification of the celebrity faces. Using mutual information as a notion of privacy means that the shredder technique targets the average case privacy, but does not guarantee the amount of privacy that is offered to each individual user.

Table 3 summarizes other experimental results. It is shown that on the networks, the shredder technique can achieve on average 66.90% loss in information while inducing 1.74% loss in accuracy with an average margin of error of 0.22%. The table also shows that it takes the shredder technique a short time to train the noise tensor, for instance on AlexNet it is 0.2 epoch. The shredder technique has 0.22% trainable parameters compared to another method, Deep Private Feature Extraction (DPFE).

off in another example of convolutional neural network (e.g., AlexNet). Here, CIFAR stands for Canadian Institute For Advanced Research. SVHN stands for Street View House Numbers and indicates image dataset for developing machine learning and object recognition algorithms. AlexNet is another example of convolution neural network. The zero-leakage line shows the original mutual information between input images and activations at the cutting point.

There is a trade-off between the amount of noise that we incur to the network, and its accuracy. As shown in FIG. 1, Shredder attempts to increase privacy while keeping the accuracy intact. FIG. 3 shows the level of privacy that can be obtained by losing a given amount of accuracy for LeNet, CIFAR-10, SVHN, and AlexNet. In FIG. 3, the number of mutual information bits that are lost from the original activation using our method is shown on the Y axis. The cutting point of the networks is their last convolution layer. This can be perceived as the output of the features section of the network, if we divide the network into features and classifier sections.

The zero-leakage line depicts the amount of information that needs to be lost in order to leak no information at all. In other words, this line points to the original number of mutual information bits in the activation that is sent to the cloud, without applying noise. The black dots show the information loss that Shredder provides, given a certain loss in accuracy. These trends are similar to that of FIG. 1, since the system based on some embodiments of the disclosed technology tries to strip the activation from its excess information, thereby preserving privacy and only keeping the information that is used for the classification task. This is the sharp (high slope) rise in information loss, seen in sub-figures of FIG. 3. Once the excess information is gone, what remains is mostly what is needed for inference. That is why there is a point (the low slope horizontal line in the figures) where adding more noise (losing more information bits) causes huge loss in accuracy. The extreme to this case can be seen in 3a, where approaching the Zero Leakage line causes about 20% loss in accuracy.

TABLE 3

Summary of the experimental results of Shredder for the benchmark networks.

| Benchmark | LeNet | CIFAR | SVHN | Alexnet | VGG-16 | 20 News group | Average |
|---|---|---|---|---|---|---|---|
| Original Mutual Information | 300.04 | 249.24 | 14.85 | 12661.52 | 28732.21 | 27.8 | — |
| Shredded Mutual Information | 31.2 | 115.3 | 5.1 | 5312.53 | 7168.75 | 6.52 | — |
| Mutual Information Loss | 89.60% | 46.27% | 64.86% | 58.05% | 75.05% | 76.55% | 66.90% |
| Accuracy Loss | 1.31% | 1.78% | 1.72% | 1.95% | 2.18% | 1.99% | 1.74% |
| Margin of Error | ±0.59% | ±0.57% | ±0.12% | ±0.01% | ±0.04% | ±0.02% | ±0.22% |
| Shredder's Learnable Params/DPFE | 0.39% | 1.29% | 0.09% | 0.03% | 0.04% | 0.10% | 0.32% |
| Number of Epochs of Training | 5.2 | 1.8 | 2.2 | 0.2 | 5.7 | 5.2 | 2.2 |

Accuracy-Privacy Trade-Off

Figure 4B:
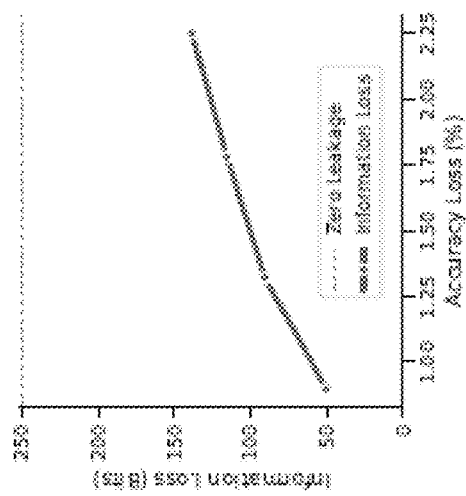
FIGS. 4A-4D shows accuracy-privacy trade-off in 4 other example networks, cut from their last convolution layer.
Figure 4D:
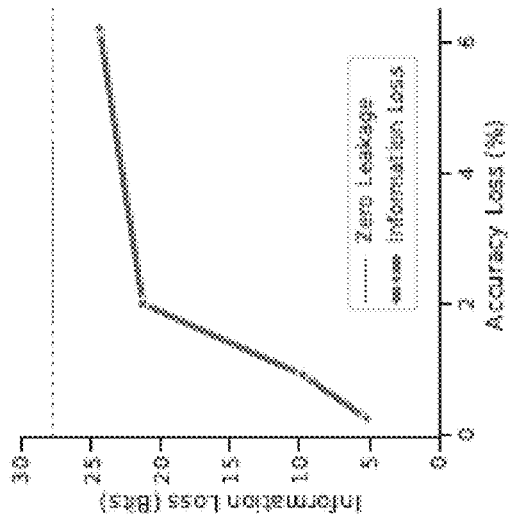
Figure 4A:
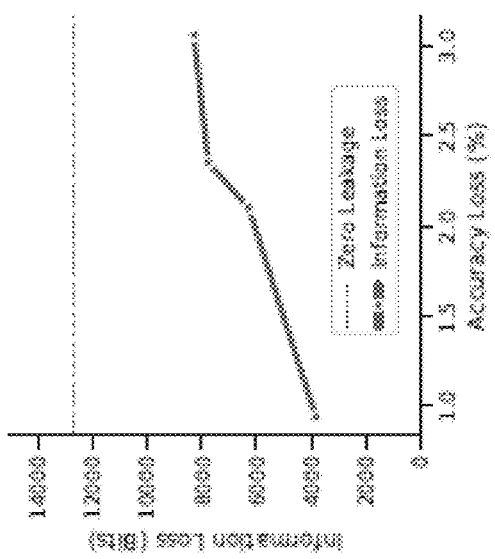
Figure 4C:
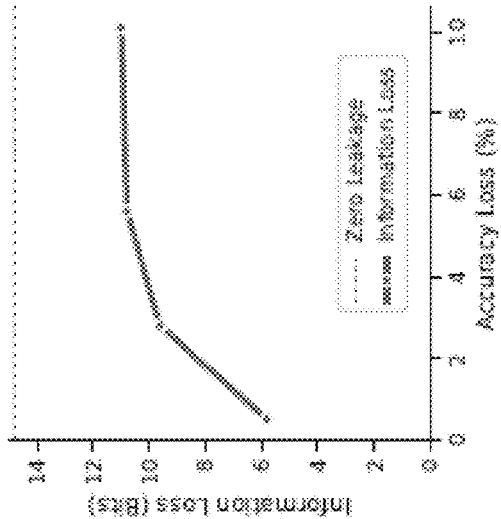

FIG. 3 shows accuracy-privacy trade-off in 4 other example networks, cut from their last convolution layer. Specifically, FIG. 3A-3D show accuracy-privacy trade-off in 4 other example networks, cut from their last convolution layer. Specifically, FIG. 3A shows accuracy-privacy trade-off in an example of convolutional neural network (e.g., LeNet), FIG. 3B shows accuracy-privacy trade-off in another example of neural network (e.g., CIFAR), FIG. 3C shows accuracy-privacy trade-off in another example of neural network, and FIG. 3D shows accuracy-privacy trade- FIGS. 4A-4D shows accuracy-privacy trade-off in 4 other example networks, cut from their last convolution layer. Specifically, FIG. 4A shows accuracy-privacy trade-off in AlexNet, FIG. 4B shows accuracy-privacy trade-off in CIFAR, FIG. 4C shows accuracy-privacy trade-off in SVHN, and FIG. 4D shows accuracy-privacy trade-off in 20Newsgroup. The zero leakage line shows the original mutual information between input images and activations at the cutting point.

Figures 5A, 5B:
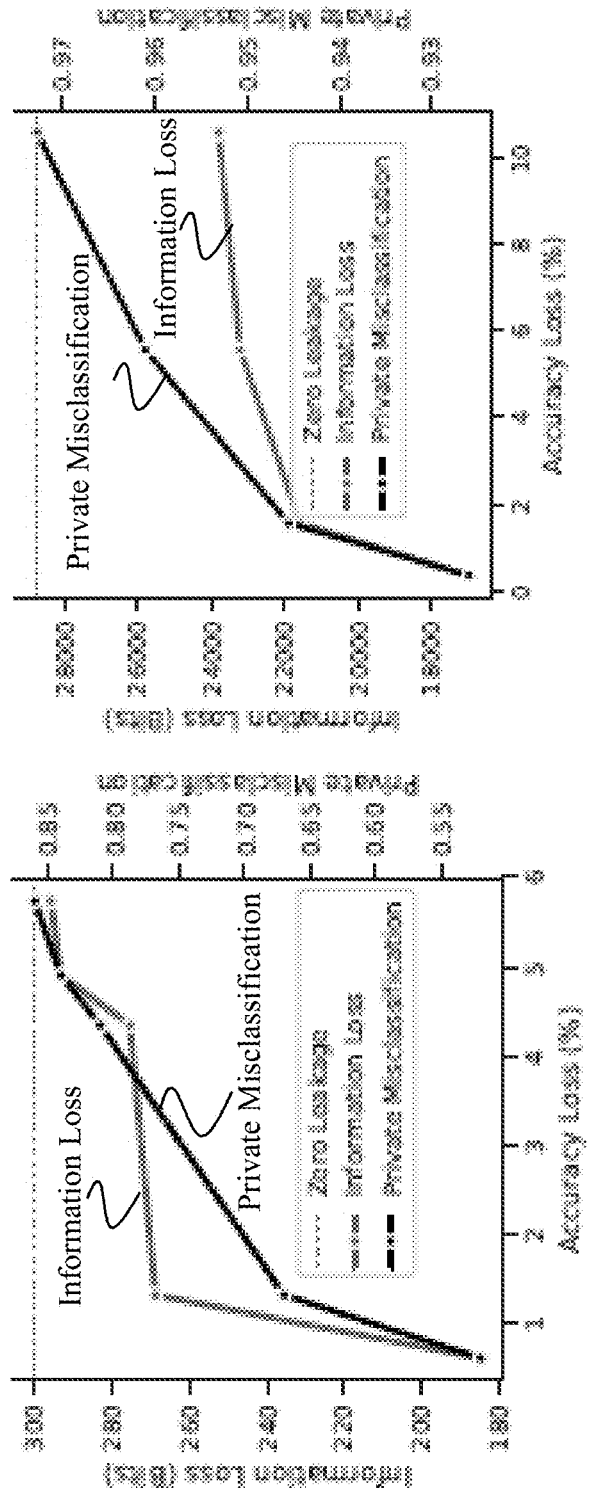
FIGS. 5A-5B shows accuracy-privacy trade-off for an example of convolution neural network for face recognition and another example of convolution neural network, cut from their last convolution layer.

FIGS. 5A-5B shows accuracy-privacy trade-off for VGG-16 (FIG. 5A) and LeNet (FIG. 5B), cut from their last convolution layer. The zero leakage line shows the original mutual information between input images and activations at the cutting point. The righthand Y axis shows the normalized (over pre-trained accuracy) misclassification rate of private labels.

There is a trade-off between the noise that is applied to the network, and its accuracy. As shown in FIG. 1, the technique implemented based on some embodiments of the disclosed technology attempts to increase privacy (noise) while keeping the accuracy intact. FIGS. 4A-4D and FIGS. 5A-5B show the level of privacy that can be obtained by losing a given amount of accuracy for LeNet, CIFAR-10, SVHN, AlexNet, VGG-16 and 20Newsgroups. The primary classification task for AlexNet, CIFAR, SVHN and 20Newsgroups is their conventional use-case, and a private task is not defined. However, in FIGS. 5A-5B for LeNet and VGG-16, the primary classification task can be modified to learn whether the number in the image is greater than five, and to detect the gender of faces in the images, respectively. The private tasks are defined as classifying what the numbers in the images are exactly and identifying the faces in the celebrity images.

FIGS. 4A-4D and FIGS. 5A-5B show the number of mutual information bits that are lost from the original activation using our method, on the left side Y axis. For LeNet and VGG-16, in FIGS. 5A-5B, there is a second Y axis which shows the normalized (over pre-trained accuracy) misclassification rate for the private task. The cutting point of the networks is their last convolution layer. The dotted Zero Leakage line depicts the amount of information that needs to be lost in order to leak no information at all. In other words, this line points to the original number of mutual information bits in the activation that is sent to the cloud, without applying noise. The connected dots show the information loss that the shredder technique implemented based on some embodiments of the disclosed technology provides, given a certain loss in accuracy. These trends are similar to that of FIG. 1, since the shredder technique tries to strip the activation from its excess information, thereby preserving privacy and only keeping the information that is used for the classification task. This is the sharp (high slope) rise in information loss, seen in FIGS. 4A-4D and FIGS. 5A-5B. Once the excess information is removed, the residue is what is needed for inference. That is why there is a point (the low-slope horizontal line in the figures) where adding more noise (losing more information bits) causes significant accuracy loss. The extreme to this case can be seen in FIGS. 5A and 4D, where approaching the zero leakage line causes over 7% loss. The misclassification rate for private tasks in LeNet and VGG-16 is increasing, as more information is lost.

Loss Function and Noise Training Analysis

Figures 6A, 6B:
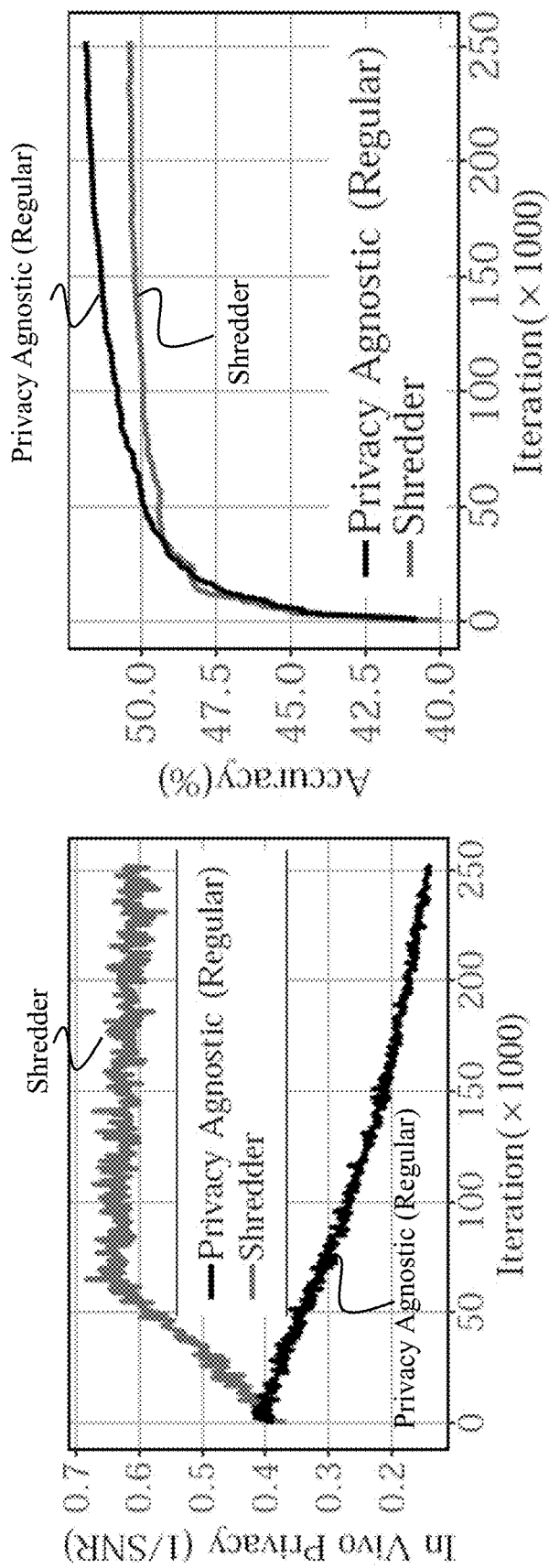
FIG. 6A illustrates graphs indicating in vivo privacy.
FIG. 6B illustrates graphs indicating accuracy, showing in vivo notion of privacy and accuracy per iteration of training on an example of convolution neural network, when the last convolution layer is the cutting point.

FIG. 6A illustrates graphs indicating in vivo privacy, and FIG. 6B illustrates graphs indicating accuracy, showing in vivo notion of privacy and accuracy per iteration of training on AlexNet, when the last convolution layer is the cutting point. The lines labeled with "privacy agnostic (regular)" show regular training with cross entropy loss function. The lines labeled with "shredder" show the disclosed system's learning, with loss function shown in Equation (4).

As Equation (4) shows, the loss function implemented based on some embodiments of the disclosed technology has an extra term, in comparison to the regular cross entropy loss function. This extra term is intended to help decrease signal to noise ratio (SNR). FIGS. 6A and 6B show part of the training process on AlexNet, cut from its last convolution layer. The lines labeled with "privacy agnostic (regular)" show how a regular noise training process would work, with cross entropy loss and Adam Optimizer. As FIG. 6A shows, the in vivo notion of privacy (1/SNR) decreases for regular training as the training moves forward. For Shredder however, the privacy increases and then stabilizes.

This is achieved through tuning of the $\lambda$ in Equation (4). When the in vivo notion of privacy reaches a certain desired level, $\lambda$ is decayed to stabilize privacy and facilitate the learning process. If it is not decayed, the privacy will keep increasing and the accuracy would increase more slowly, or even start decreasing. The accuracy, however, increases at a higher pace for regular training, compared to the disclosed system in FIG. 6B. It is noteworthy that this experiment was carried out on the training set of ImageNet, and when the training is finished, there is negligible degradation in accuracy for the disclosed system, Shredder, on the test set, in comparison to the regularly trained model.

Figure 7:
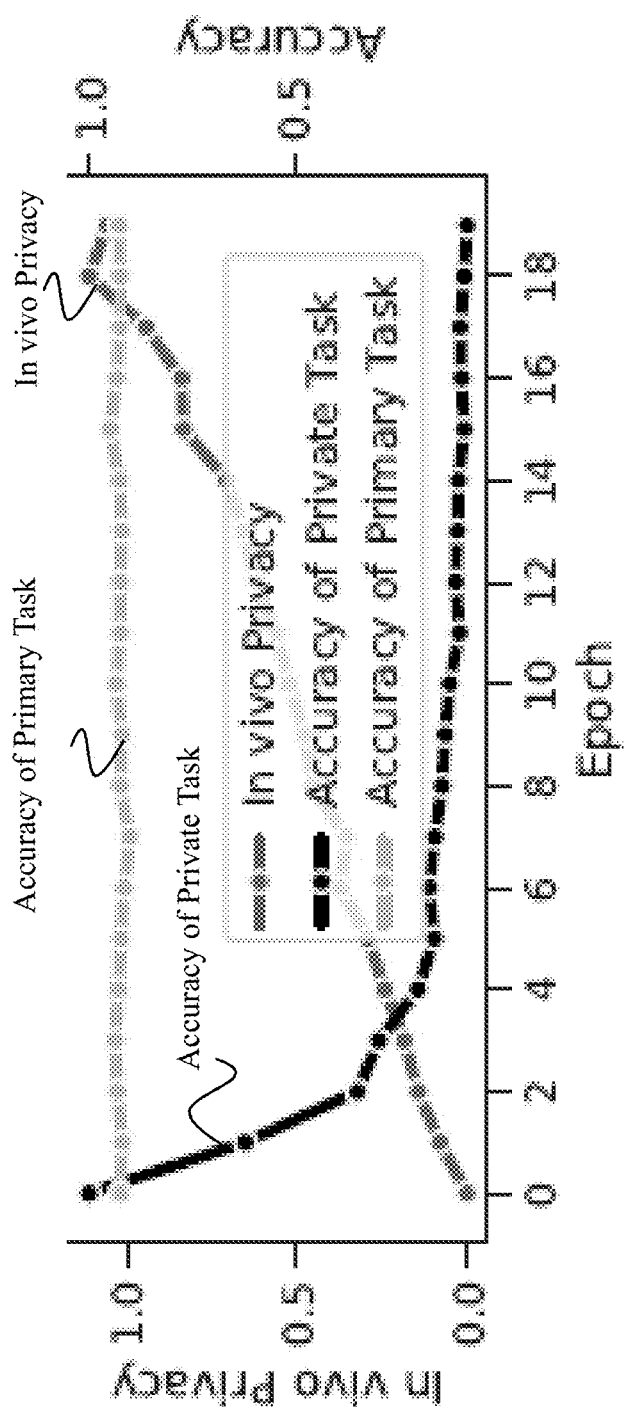
FIG. 7 shows in vivo notion of privacy, normalized accuracy of private task and primary task per epoch of training on an example of convolution neural network for face recognition, when the last convolution layer is the cutting point.

FIG. 7 shows in vivo notion of privacy, normalized accuracy of private task and primary task per epoch of training on VGG-16, when the last convolution layer is the cutting point.

Figures 8A, 8B:
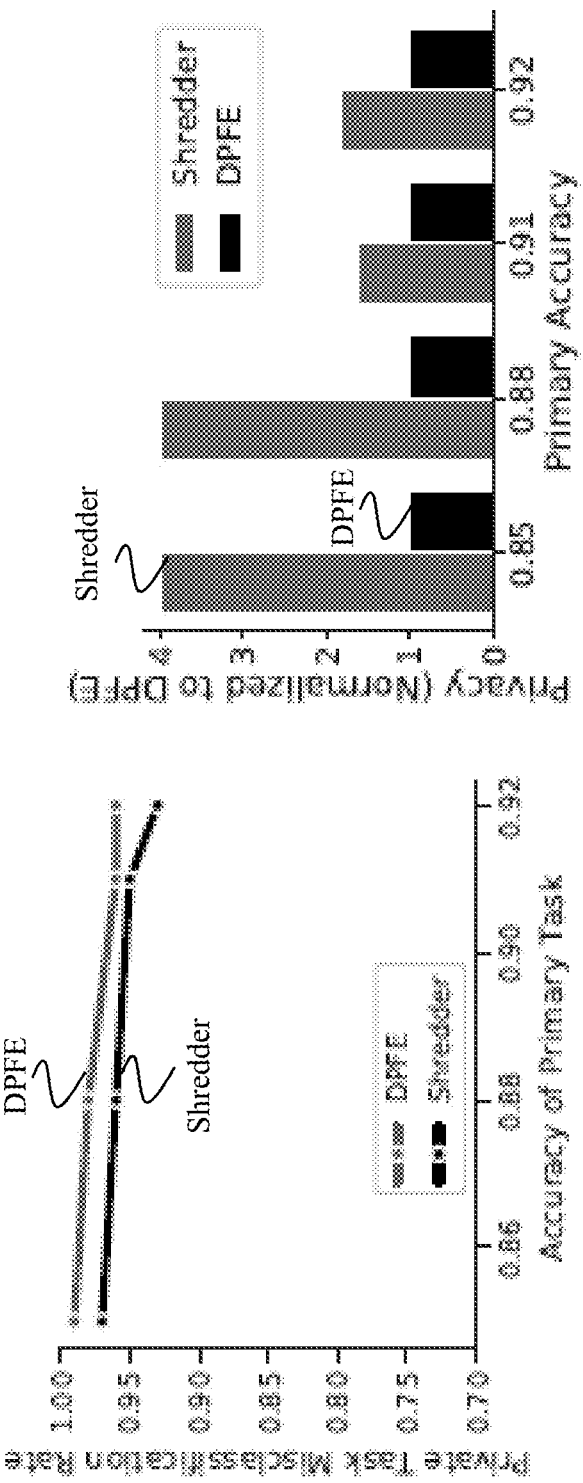
FIGS. 8A-8B show normalized misclassification rate of private labels (identity) and privacy improvement comparison with the deep private feature extraction (DPFE) for different accuracy levels of the primary task (gender classification) over an example of convolution neural network for face recognition on face recognition dataset.

FIG. 8A shows normalized misclassification rate of private labels (identity) and FIG. 8B shows privacy improvement comparison with DPFE (Deep Private Feature Extraction) for different accuracy levels of the primary task (gender classification) over VGG-16 on VGG-Face dataset.

As Equation (5) shows, the loss function implemented based on some embodiments of the disclosed technology has an extra term, in comparison to the regular cross entropy loss function. This extra term is intended to help eliminate excess information. FIG. 7 shows part of the training process on VGG-16 for gender classification on the VGG-Face dataset, cut from its last convolution layer. The multiplicative noise tensor was initialized to 1 and the additive to 0, so as to better show the effectiveness of the method, on a pre-trained network with no initial noise to help privacy. The line indicating the accuracy of the private task shows identifying which face belongs to whom.

As FIG. 7 shows, the in vivo notion of privacy (1=SNR) is increasing as the training moves forward. The accuracy of the private task, however, is decreasing while the accuracy of the primary task is relatively stable. It is noteworthy that the accuracy numbers are normalized to the pretrained accuracies for private and primary tasks.

The DPFE (Deep Private Feature Extraction) is a privacy protection mechanism that aims at obfuscating given private labels. For these experiments, VGG-16 network is used with celebrity images which is the same setup used in the DPFE. DPFE partitions the network in two partitions, first partition to be deployed on the edge and the second for the cloud. It also modifies the network architecture by adding an autoencoder in the middle, to reduce dimensions, and then re-training the entire network with its loss function. DPFE's loss function assumes knowledge of private labels, and tries to maintain accuracy while removing the private labels through decreasing the distance between intermediate activations with different private labels and increasing the distance between intermediate activations of inputs with the same private label. After training, for each inference, a randomly generated noise is added to the intermediate results on the fly. DPFE can only be effective if the user knows what s/he wants to protect against, whereas the shredder technique implemented based on some embodiments of the disclosed technology offers a more general approach that tries to eliminate any information that is irrelevant to the primary task. Table 3 has a row which compares the number of trainable parameters for the shredder technique with DPFE and it can be seen that the shredder technique's parameters are extremely lower than DPFE's. DPFE also incurs extra computation overhead with its embedded auto-encoder and is intrusive to the model, since it modifies the architecture and parameters, and needs to re-deploy the model. Whereas, the shredder technique does not modify the already deployed models, it just multiplies and adds the noise.

To run experiments, the intermediate outputs of the networks are fed to two classifiers, for gender and identity. FIG. 8A compares DPFE to the shredder technique implemented based on some embodiments of the disclosed technology in terms of the misclassification rate of the private task, i.e. the identity classification (identity compromise) for given levels of accuracy for the main task. The shredder technique implemented based on some embodiments of the disclosed technology causes negligibly less misclassification rate, which can be attributed to its unawareness of the private labels, and also its fewer number of trainable parameters which limit its control on the training.

FIG. 8B shows privacy improvement of the shredder technique implemented based on some embodiments of the disclosed technology over DPFE. It can be inferred from FIG. 8B that the shredder technique implemented based on some embodiments of the disclosed technology performs better, since it has a more general approach which scrambles more overall information. DPFE takes an approach which is directed at a specific goal, which impedes it from providing privacy for aspects other than the private task. To compare the methods more intuitively, if there are images of people with their surroundings, DPFE would make sure that the identities of these people are hidden, but would not eliminate the background, or any other information. The shredder technique implemented based on some embodiments of the disclosed technology, however, removes information in all aspects, possibly eliminating the background as well.

In Vivo Vs. Ex Vivo Notion of Privacy Analysis

Figures 9A, 9B:
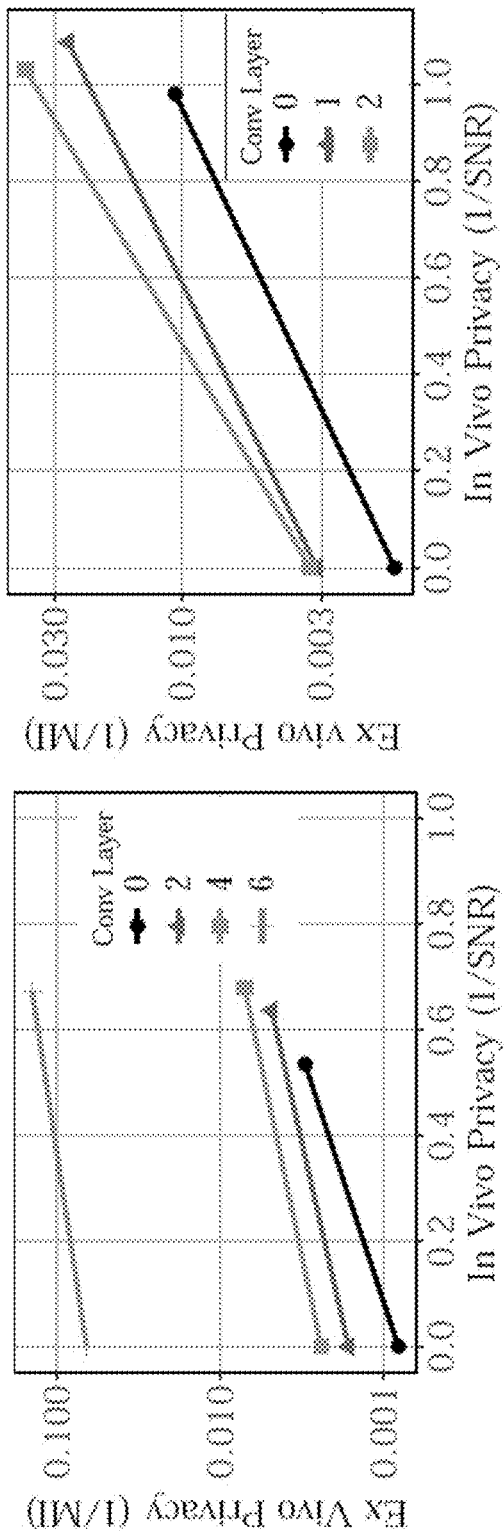
FIG. 9A shows in vivo vs ex vivo notion of privacy in an example of convolution neural network.
FIG. 9B shows in vivo vs ex vivo notion of privacy in another example of convolution neural network, for different cutting points.

FIG. 9A shows in vivo vs ex vivo notion of privacy in SVHN, and FIG. 9B shows in vivo vs ex vivo notion of privacy in LeNet, for different cutting points. The similar slope of the lines show that different layers behave similarly in terms of losing information (ex vivo privacy) when the same amount of noise is applied to them during training (in vivo privacy).

Due to the operations that take place along the execution of different layers of a neural network (e.g., convolution, normalization, pooling, etc.), mutual information between the inputs to the network and the activations keep decreasing as we move forward. So, deeper layers have lower mutual information than the more surface layers, and when noise is injected into them, it is similar to giving the privacy level a head start, since it already has less information compared to a layer on the surface. FIG. 9A shows that incurring the same amount of noise (which induces in vivo privacy, SNR) to convolution layers of SVHN, causes information loss of for all four layers. This does not mean the same amount of ex vivo privacy, because each layer had a different starting point for ex vivo privacy. What it means is that the information loss is proportional to incurred noise and the proportion is consistent over all the 4 layers shown.

Cutting Point Trade-Offs

Figures 10A, 10B:
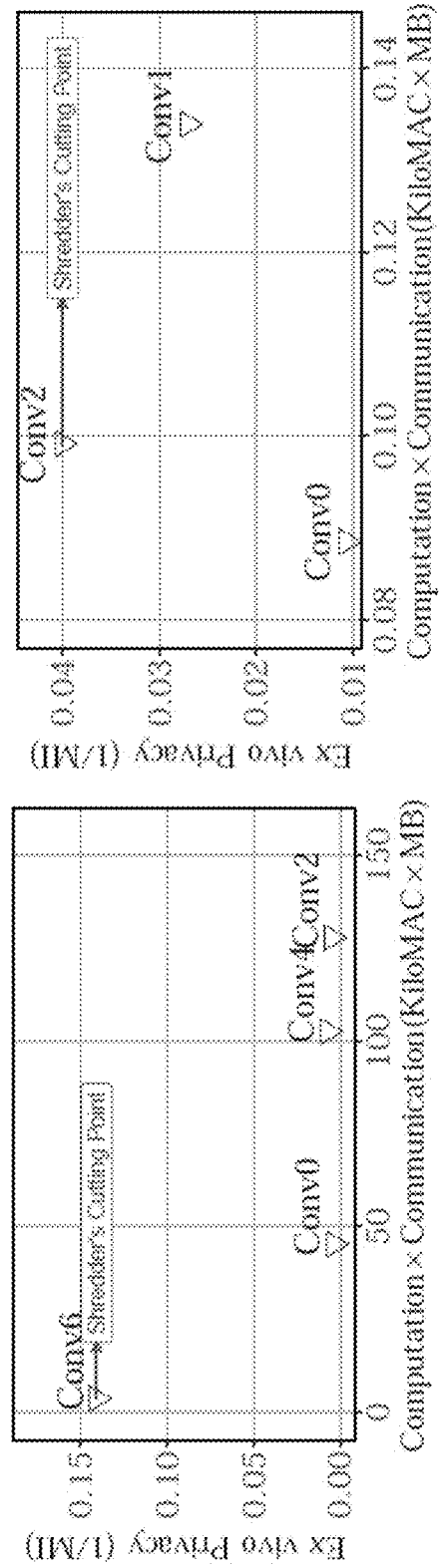
FIG. 10A shows computation/communication costs and privacy with deeper layers selected in an example of convolution neural network for the noise addition of an example of the disclosed technique.
FIG. 10B shows computation/communication costs and privacy with deeper layers selected in another example of convolution neural network for the noise addition of the example of the disclosed technique.

FIG. 10A shows computation/communication costs and privacy with deeper layers selected in SVHN for Shredder's noise addition, and FIG. 10B shows computation/communication costs and privacy with deeper layers selected in LeNet for Shredder's noise addition. The method and system based on some embodiments of the disclosed technology maintain a minimal accuracy loss of for all of the cutting points.

Layer selection for network cutting point depends on different factors and is mostly an interplay of communication and computation of the edge device. It depends on how many layers of the network the edge device can handle computationally, and how much data it can send through the connection protocols it can support. If deeper layers are selected in the network, there will be a lower mutual information between the image and activation at the beginning, and even more information will be lost by maximizing the noise. Therefore, as a general rule, it is better to choose the deepest layer that the edge device can support.

As shown in FIGS. 10A and 10B, the deeper the layer, the more unnecessary information will be lost, and therefore ex vivo privacy is monotonically increasing. Computation cost is also monotonically increasing as it's a cumulative function of computation costs of all the preceding layers. Communication cost, on the other hand, is not typically monotonic as the size of the output of a layer can be smaller and also larger than the size of its input. Some embodiments of the disclosed technology may model the total cost as for a specific cutting point. For SVHN, as FIG. 10A shows, Conv6 is the obvious cutting point choice as it incurs less cost and exhibits more privacy compared to other layers. That is mainly because Conv6 has significantly smaller output than its preceding layers and it substantially brings down the communication cost. For LeNet (FIG. 10B), Conv2 is selected over Conv0 as incurring one percent cost is likely worth the gained privacy level.

As cloud-based DNNs impact more and more aspects of users' everyday life, it is timely and crucial to consider their impact on privacy. As such, the method and system based on some embodiments of the disclosed technology use noise to reduce the information content of the communicated data to the cloud while still maintaining high levels of accuracy. By casting the noise injection as an optimization for finding a tensor of differentiable elements, the disclosed method and system may strike an asymmetric balance between accuracy and privacy. Experimentation with multiple DNNs showed that the disclosed method and system can significantly reduce the information content of the communicated data with only 1.46% accuracy loss.

Figure 11:
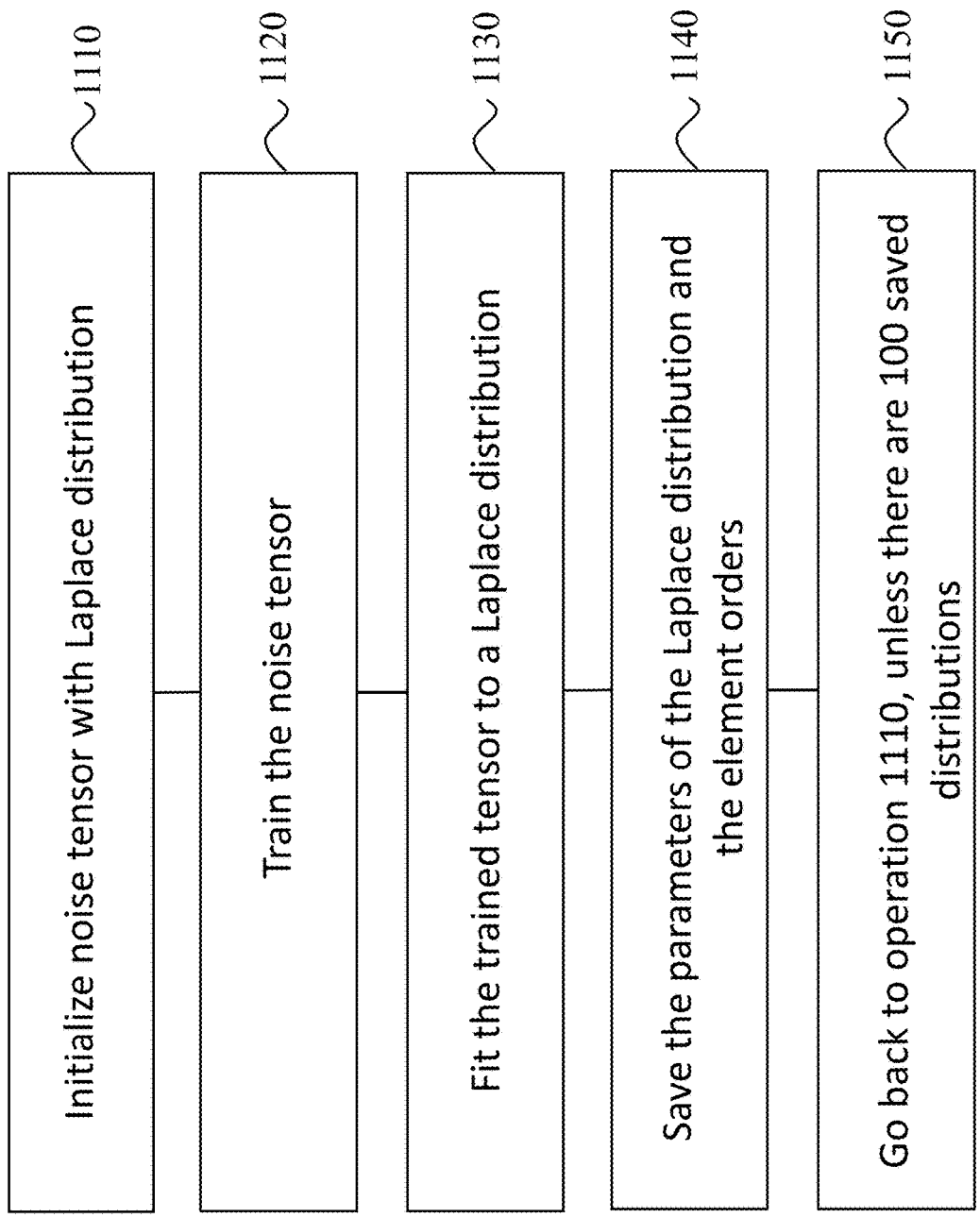
FIG. 11 shows an example of the noise distribution training phase based on some embodiments of the disclosed technology.

FIG. 11 shows an example of the noise distribution training phase based on some embodiments of the disclosed technology. The example of the noise distribution training phase may include, at operation 1110, initializing noise tensor with Laplace distribution, at operation 1120, training the noise tensor, at operation 1130, fitting the trained tensor to a Laplace distribution, at operation 1140, saving the parameters of the Laplace distribution and the element orders, and at operation 1150, going back to operation 1110, unless there are 100 saved distributions.

Figure 12:
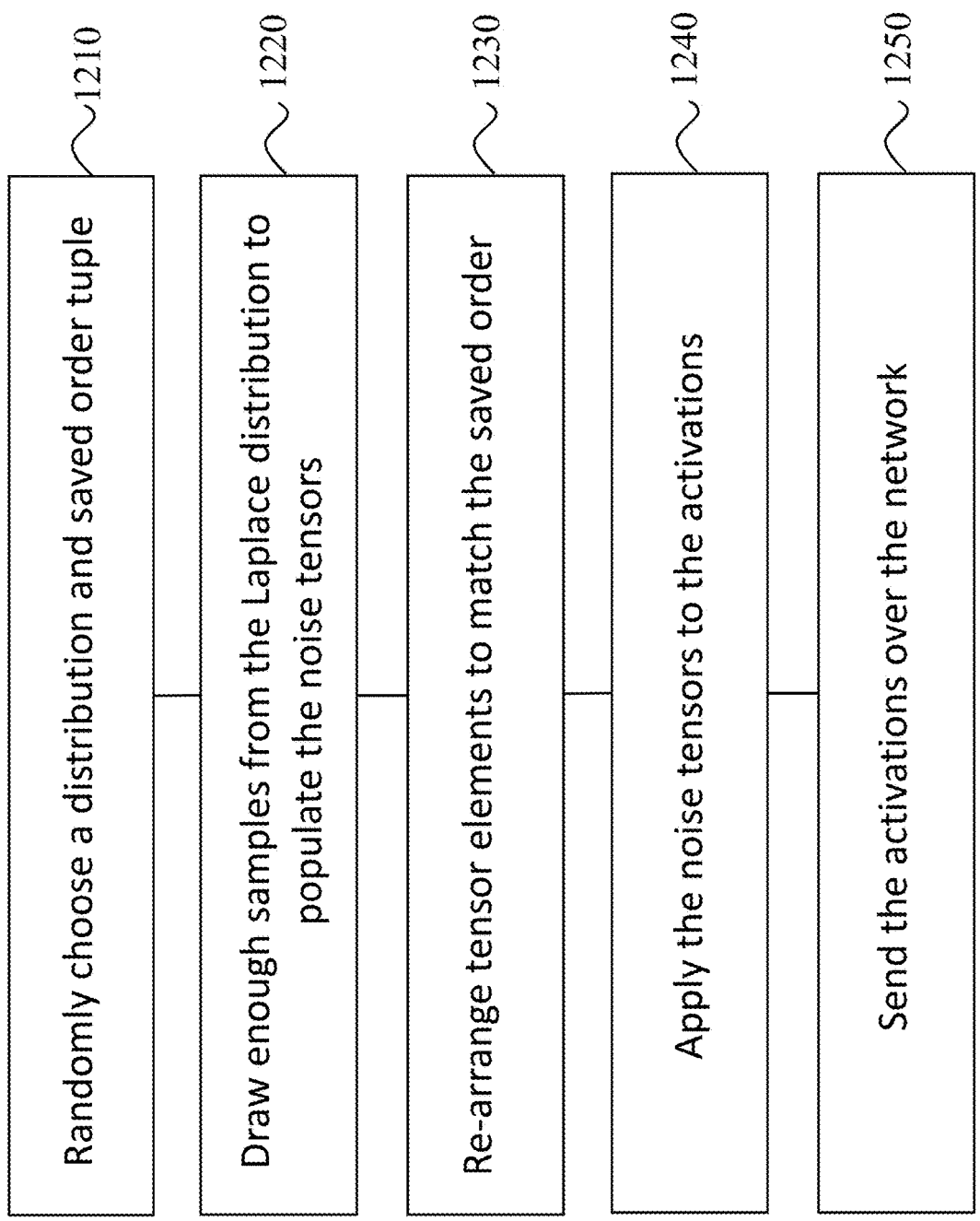
FIG. 12 shows an example of the inference phase based on some embodiments of the disclosed technology.

FIG. 12 shows an example of the inference phase based on some embodiments of the disclosed technology. The example of the inference phase may include, at operation 1210, randomly choosing a distribution and saved order tuple, at operation 1220, drawing enough samples from the Laplace distribution to populate the noise tensors, at operation 1230, re-arranging tensor elements to match the saved order, at operation 1240, applying the noise tensors to the activations, and at operation 1250, sending the activations over the network.

Figure 13:
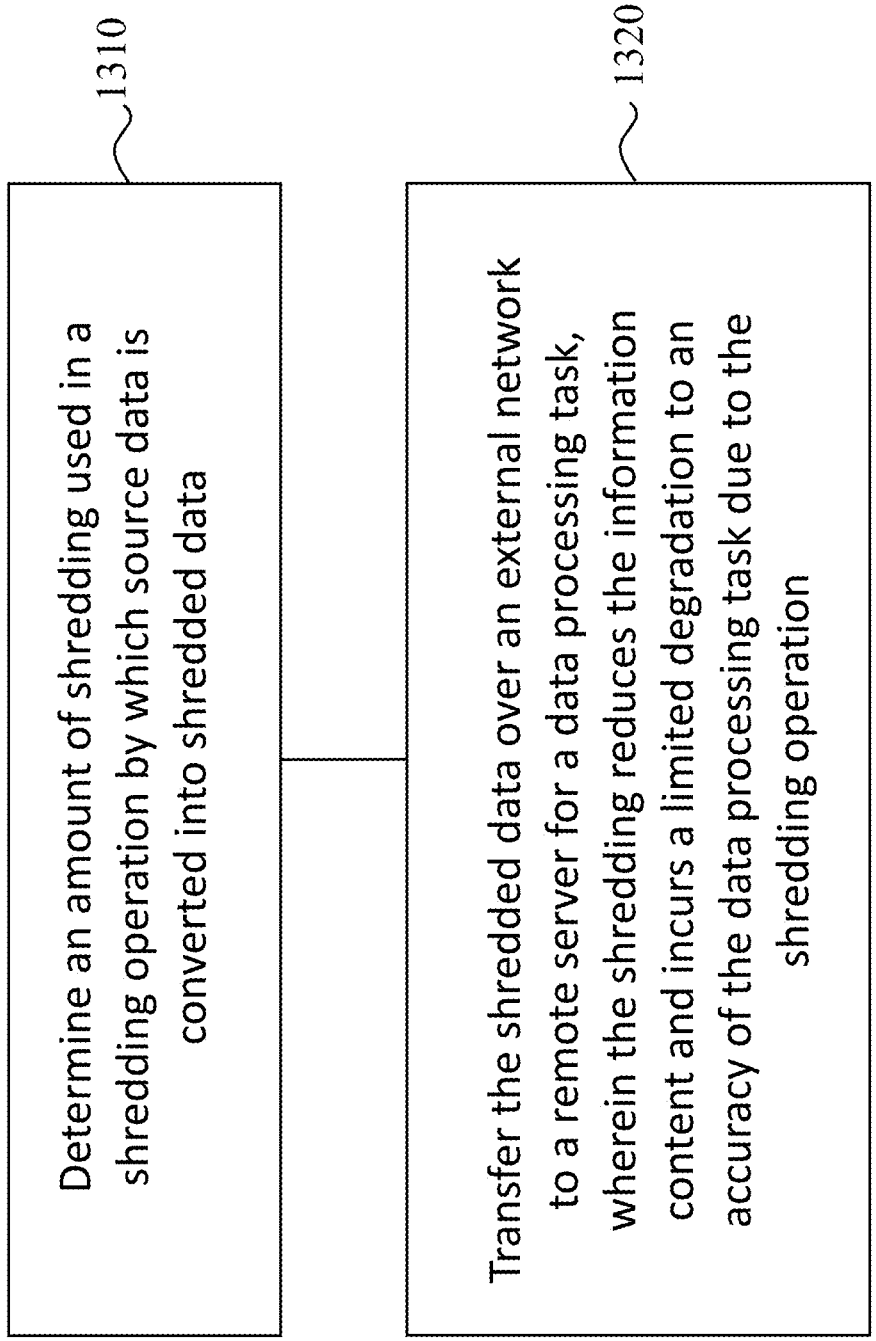
FIG. 13 shows an example of a data processing method based on some embodiments of the disclosed technology.

FIG. 13 shows an example of a data processing method based on some embodiments of the disclosed technology. The example of a data processing method may include, at operation 1310, determining an amount of shredding used in a shredding operation by which source data is converted into shredded data, and, at operation 1320, transferring the shredded data over an external network to a remote server for a data processing task. Here, the shredding reduces the information content and incurs a limited degradation to an accuracy of the data processing task due to the shredding operation.

Figure 14:
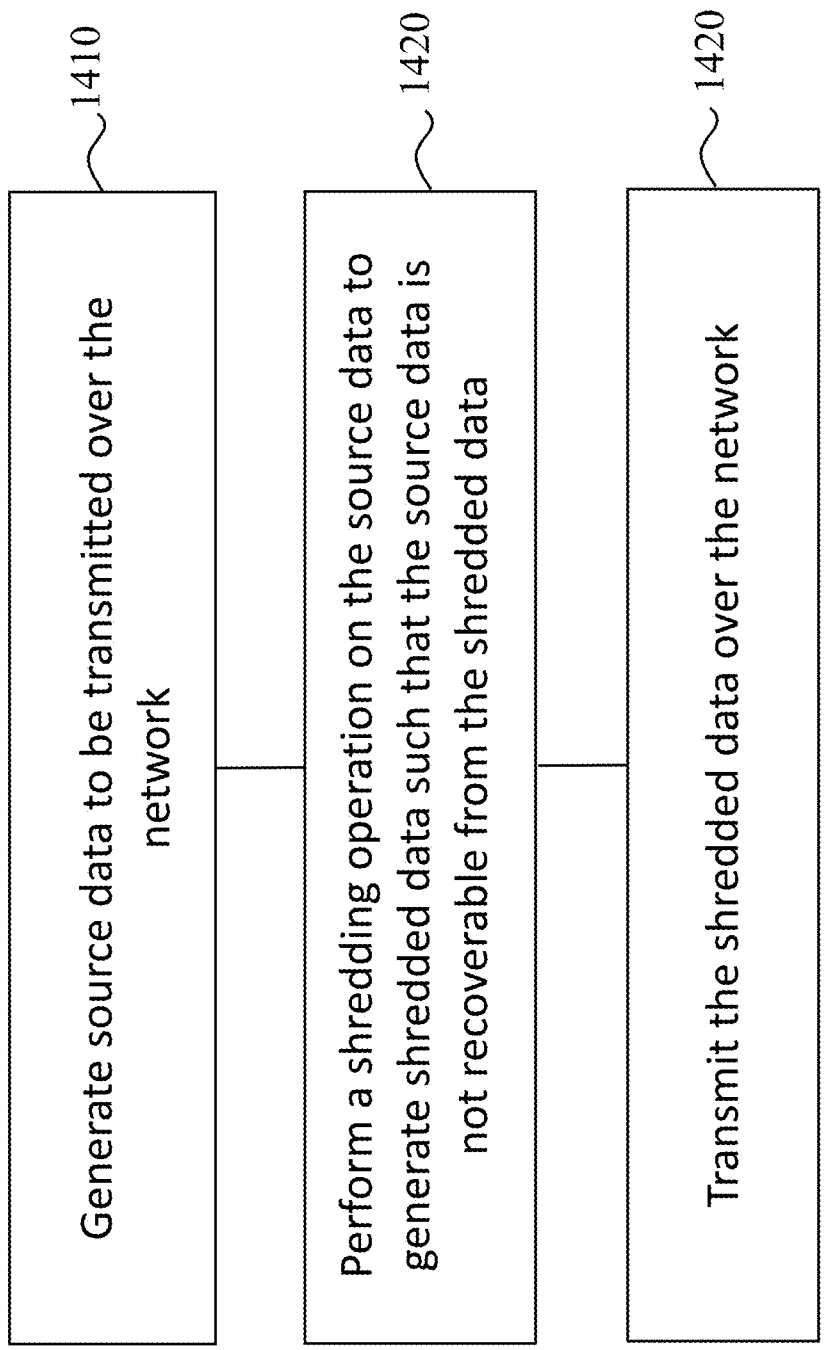
FIG. 14 shows an example method of transmitting data over a network based on some embodiments of the disclosed technology.

FIG. 14 shows an example method of transmitting data over a network based on some embodiments of the disclosed technology. The example method of transmitting data over a network may include, at operation 1410, generating source data to be transmitted over the network, at operation 1420, performing a shredding operation on the source data to generate shredded data such that the source data is not recoverable from the shredded data, and, at operation 1430, transmitting the shredded data over the network.

Figure 15:
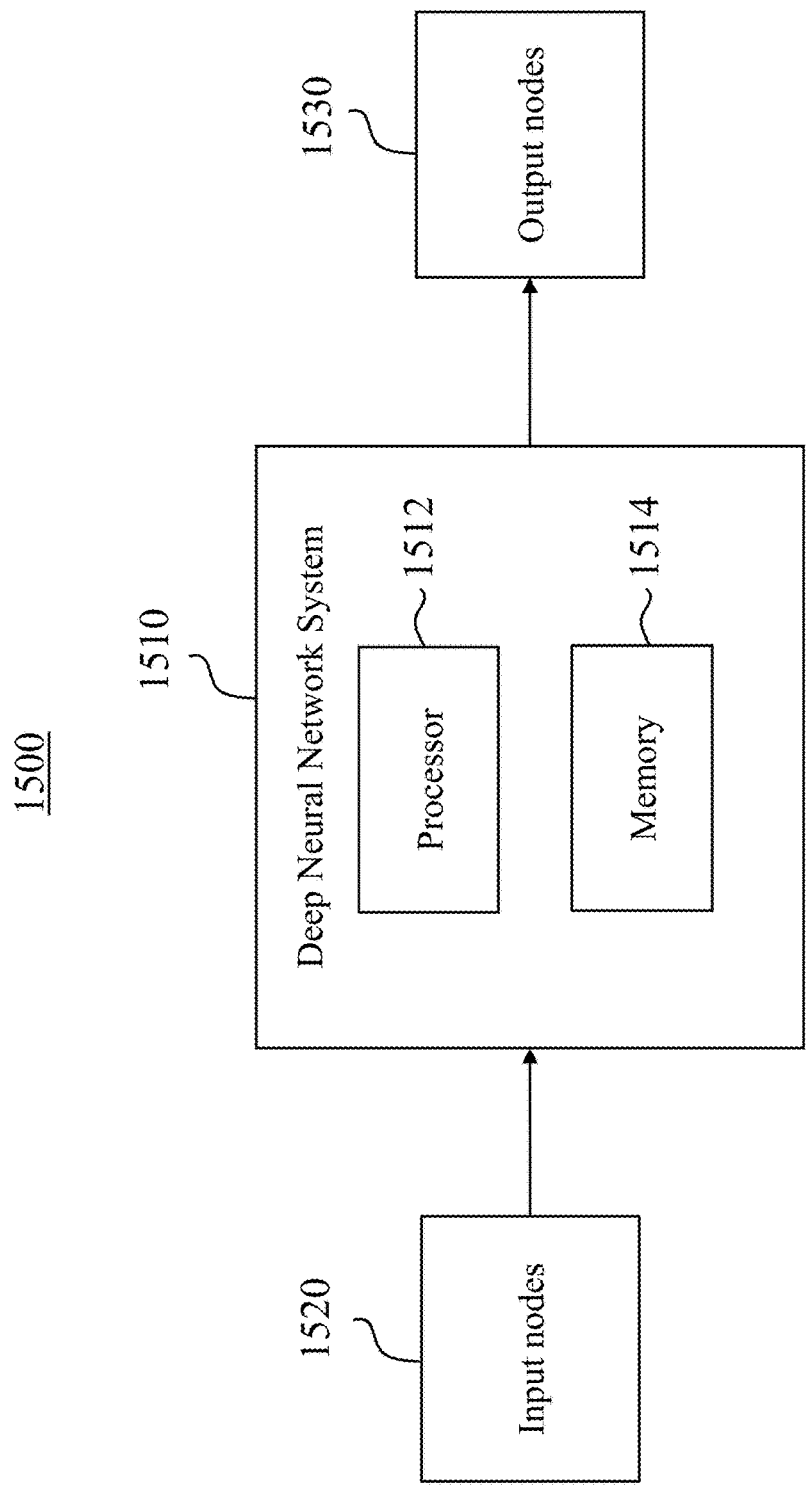
FIG. 15 shows an example of a deep neural network implemented based on some embodiments of the disclosed technology.

FIG. 15 shows an example of a deep neural network 1500 implemented based on some embodiments of the disclosed technology. The deep neural network 1500 may include a deep neural network system 1510, one or more input nodes 1520, and one or more output nodes 1530. The deep neural network system 1510 may include one or more processors 1512 and one or more memory devices 1514 operatively coupled to the one or more processors 1512. One or more of the processors 1512 may be operable to receive data and noise. The deep neural network 1500 may perform the operations of the noise distribution training phases discussed above.

One or more of the processors 1512 may be operable to train the deep neural network 1500 based on a training dataset. The training can be performed to learn the noise distributions. In some implementations, one or more of the processors 1512 may be operable to determine which layer is the optimal choice for cutting the DNN to strike the best balance between computation and communication while considering privacy. In some implementations, one or more of the processors 1512 may be operable to configure one or more input nodes 1520 and one or more output nodes 1530.

Figure 16:
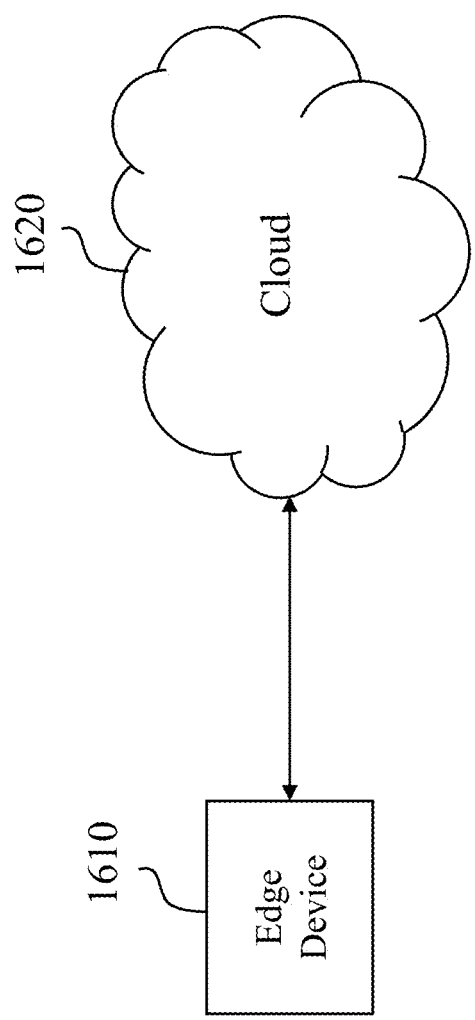
FIG. 16 shows an example of an edge device in communication with a cloud based on some embodiments of the disclosed technology.

FIG. 16 shows an example of an edge device 1610 in communication with a cloud 1620 based on some embodiments of the disclosed technology. When a set of data is given to the neural network trained as discussed above, the edge device 1610 and the cloud 1620 may perform the operations of the inference phase discussed above. In some implementations, the edge device 1610 may perform the operations of the inference phase, including choosing a distribution, drawing samples from the distribution, re-arranging tensor elements to match the saved order, and applying the noise tensors to the activations. The final noisy activation is sent from the edge device 1610 to the cloud 1620 to perform the rest of the inference. The operations of the inference phase performed by the edge device 1610 and the cloud 1620 may maintain the accuracy of the data processing task by using the deep neural network 1500 trained to learn the noise distributions.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A data processing method, comprising:
   determining an amount of conversion from source data to converted data in a conversion operation; and
   transferring the converted data over an external network to a remote server for a data processing task,
   wherein the conversion shredding reduces an information content to be transferred over the external network to the remote server and incurs a limited degradation to an accuracy of the data processing task due to the conversion operation,
   wherein the conversion operation includes a training operation that includes:
   initializing a noise tensor with a predetermined noise distribution;
   training the noise tensor such that the trained noise tensor maintains the accuracy and is then fitted to a distribution; and
   storing parameters and tensor element orders of the trained noise tensor.

2. The method of claim 1, wherein the data processing task includes an interference computing of a machine learning technique.

3. The method of claim 2, wherein the conversion operation includes adding a noise to the source data to generate the converted data.

4. The method of claim 1, wherein the conversion operation further includes:
   drawing samples from the stored parameters of the trained noise tensor;
   rearranging tensor elements of the selected samples to match the stored tensor element orders of the noise tensor; and
   applying the rearranged tensor elements to activations to be transferred to the remote server.

5. The method of claim 1, wherein the noise distribution is a distribution with a set of parameters.

6. The method of claim 1, wherein the conversion operation includes:
   selecting, as a local network, one or more layers of a deep neural network (DNN) with multiple layers between input and output layers such that a computation of the one or more layers is made on an edge device configured to control data flow at a boundary between the local network and the DNN and selecting, as a remote network, remaining layers of the DNN;
   obtaining a first activation tensor by providing an input to the local network and obtaining an output of the local network responsive to the input;
   obtaining a second activation tensor by injecting a noise tensor sampled from stored distributions to the first activation tensor;
   feeding the first activation tensor and the second activation tensor to the remote network to obtain first and second results, respectively, from the remote network;
   finding a trained noise tensor that minimizes a loss function of the DNN;
   adding the trained noise tensor to a third activation to be transmitted to the remote network; and
   transmitting the third activation.

7. The method of claim 6, wherein the loss function is determined based on a difference between the first and second results.

8. The method of claim 6, wherein the trained noise tensor is determined such that mutual information between the input and at least one of the first and second activation tensors is minimized.

9. The method of claim 8, wherein the mutual information between the input and the at least one of the first and second activation tensors is determined based on a signal to noise ratio.

10. The method of claim 6, wherein the first activation tensor is an intermediate activation tensor for training.

11. A method of transmitting data over a network, comprising:
    generating source data to be transmitted over the network;
    performing a conversion operation on the source data to convert the source data into converted data such that the source data is not recoverable from the converted data; and
    transmitting the converted data over the network,
    wherein the conversion operation includes:
    selecting, as a local network, one or more layers of a deep neural network (DNN) with multiple layers between input and output layers such that a computation of the one or more layers is made on an edge device configured to control data flow at a boundary between the local network and the DNN and selecting, as a remote network, remaining layers of the DNN;
    obtaining a first activation tensor by providing an input to the local network and obtaining an output of the local network responsive to the input;
    obtaining a second activation tensor by injecting a noise tensor sampled from stored distributions to the first activation tensor;
    feeding the first activation tensor and the second activation tensor to the remote network to obtain first and second results, respectively, from the remote network;
    finding a trained noise tensor that minimizes a loss function of the DNN;
    adding the trained noise tensor to a third activation to be transmitted to the remote network; and
    transmitting the third activation.

12. The method of claim 11, wherein the network includes a deep neural network (DNN).

13. The method of claim 12, wherein the conversion operation includes adding noise to the source data to generate the converted data including reduced data content and added noise such that an inference from the converted data by the DNN yields a same outcome as an inference from the source data.

14. The method of claim 11, wherein the sampled noise tensor is obtained based on a distribution with a set of parameters.

15. The method of claim 11, wherein the loss function is determined based on a difference between the first and second results.

16. The method of claim 11, wherein the trained noise tensor is determined such that mutual information between the input and at least one of the first and second activation tensors is minimized.

17. The method of claim 16, wherein the mutual information between the input and the at least one of the first and second activation tensors is determined based on a signal to noise ratio.

18. The method of claim 11, wherein the first activation tensor is an intermediate activation tensor for training.

* * * * *